United States Patent
Suzuki et al.

(10) Patent No.: US 9,215,695 B2
(45) Date of Patent: Dec. 15, 2015

(54) MOBILE STATION APPARATUS, BASE STATION APPARATUS, WIRELESS COMMUNICATION SYSTEM, WIRELESS COMMUNICATION METHOD AND INTEGRATED CIRCUIT

(75) Inventors: Shoichi Suzuki, Osaka (JP); Yosuke Akimoto, Osaka (JP); Tatsushi Aiba, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 294 days.

(21) Appl. No.: 13/808,454

(22) PCT Filed: Jun. 28, 2011

(86) PCT No.: PCT/JP2011/064824
§ 371 (c)(1),
(2), (4) Date: Mar. 4, 2013

(87) PCT Pub. No.: WO2012/005145
PCT Pub. Date: Jan. 12, 2012

(65) Prior Publication Data
US 2013/0156011 A1    Jun. 20, 2013

(30) Foreign Application Priority Data
Jul. 5, 2010    (JP) .................................. 2010-152565

(51) Int. Cl.
*H04L 27/06* (2006.01)
*H04W 72/04* (2009.01)
(Continued)

(52) U.S. Cl.
CPC .............. *H04W 72/04* (2013.01); *H04L 1/1858* (2013.01); *H04W 28/06* (2013.01)

(58) Field of Classification Search
CPC .............. H04L 5/0055; H04L 1/0073; H04W 72/0413; H04W 72/0446; H04B 7/0417
USPC ........................... 370/329; 375/341, 343, 259
See application file for complete search history.

(56) References Cited

U.S. PATENT DOCUMENTS

| 2006/0072579 A1* | 4/2006 | Ward et al. ................. 370/395.1 |
| 2010/0128692 A1 | 5/2010 | Aiba et al. |

(Continued)

FOREIGN PATENT DOCUMENTS

| WO | WO 2009/008337 A1 | 1/2009 |
| WO | WO 2010/050371 A1 | 5/2010 |

OTHER PUBLICATIONS

CATT, "DAI Design for LTE-A", 3GPP TSG RAN WG1 Meeting #60bis, R1-101758, Apr. 12-16, 2010, Beijing, China.
(Continued)

*Primary Examiner* — Charles C Jiang
*Assistant Examiner* — Will Lin
(74) *Attorney, Agent, or Firm* — Birch, Stewart, Kolasch & Birch, LLP

(57) ABSTRACT

A mobile station apparatus efficiently codes and transmits ACK/NACKs for a plurality of PDSCHs. The mobile station transmits a plurality of ACK/NACKs for transport blocks transmitted by a base station apparatus in a plurality of component carriers to the base station. First and second ACK/NACKs are individually coded, repetition processing is performed on coded bits of the first ACK/NACKs until the number of coded bits of the first ACK/NACKs reaches a first value, the repetition processing is performed on the coded bits of the second ACK/NACKs until the number of coded bits reaches a second value, the coded bits of the first ACK/NACKs and the coded bits of the second ACK/NACKs are concatenated, and the first ACK/NACKs and the second ACK/NACKs are transmitted to the base station apparatus using one physical uplink channel.

15 Claims, 9 Drawing Sheets

(51) Int. Cl.
*H04L 1/18* (2006.01)
*H04W 88/02* (2009.01)
*H04W 88/08* (2009.01)
*H04W 28/06* (2009.01)

(56) References Cited

U.S. PATENT DOCUMENTS

| | | |
|---|---|---|
| 2010/0157836 A1 | 6/2010 | Aiba et al. |
| 2011/0228863 A1* | 9/2011 | Papasakellariou et al. ... 375/259 |
| 2011/0280346 A1* | 11/2011 | Yang et al. ............... 375/341 |
| 2012/0134289 A1 | 5/2012 | Aiba et al. |
| 2012/0134337 A1 | 5/2012 | Aiba et al. |

OTHER PUBLICATIONS

International Search Report for PCT/JP2011/064824 dated Oct. 4, 2011.
Nokia Siemens Networks, Nokia, "Performance evaluation of UCI multiplexing schemes on PUSCH in case of SU-MIMO", 3GPP TSG RAN WG1 Meeting #61, R1-102962, May 10-14, 2010, Montreal, Canada.
Panasonic, "ACK/NACK multiplexing schemes on PUSCH", 3GPP TSG RAN WG1 Meeting #61bis R1-103760, Jun. 28-Jul. 2, 2010, Dresden, Germany.
Research in Motion, UK Limited, "UCI Transmission in the Presence of UL-SCH Data", 3GPP TSG RAN WG1 Meeting #61, R1-103067, May 10-14, 2010, Montreal, Canada.

* cited by examiner

MOBILE STATION APPARATUS, BASE STATION APPARATUS, WIRELESS COMMUNICATION SYSTEM, WIRELESS COMMUNICATION METHOD AND INTEGRATED CIRCUIT

TECHNICAL FIELD

The present invention relates to a mobile station apparatus, a base station apparatus, a wireless communication system, a wireless communication method and an integrated circuit.

BACKGROUND ART

The evolution of a radio access scheme and a radio network in cellular mobile communication (hereinafter referred to as "Long Term Evolution (LTE)" or "Evolved Universal Terrestrial Radio Access (EUTRA)") is being examined in a 3rd Generation Partnership Project (3GPP). In the LTE, as a communication scheme of radio communication (downlink) from a base station apparatus to a mobile station apparatus, an Orthogonal Frequency Division Multiplexing (OFDM) scheme, which is multicarrier transmission, is used. Moreover, as a communication scheme of radio communication (uplink) from a mobile station apparatus to a base station apparatus, an SC-FDMA (Single-Carrier Frequency Division Multiple Access) scheme, which is single carrier transmission, is used.

In the LTE, an ACK (Acknowledgement)/NACK (Negative Acknowledgement) showing whether or not the mobile station apparatus succeeds in decoding downlink data received in a Physical Downlink Shared Channel (PDSCH) is transmitted using a Physical Uplink Control Channel (PUCCH) or a Physical Uplink Shared Channel (PUSCH). When the mobile station apparatus transmits the ACK/NACK, if the radio resource of the PUSCH is not allocated, the ACK/NACK is transmitted in the PUCCH. When the mobile station apparatus transmits the ACK/NACK, if the radio resource of the PUSCH is allocated, the ACK/NACK is transmitted in the PUSCH.

In a radio access scheme and a radio network (hereinafter referred to as "Long Term Evolution-Advanced (LTE-A)" or "Advanced Evolved Universal Terrestrial Radio Access (A-EUTRA)") that utilizes a frequency band broader than the LTE to realize faster data communication, the acquisition of backward compatibility with the LTE is being examined. In other words, the base station apparatus of the LTE-A can simultaneously perform radio communication with the mobile station apparatuses of both the LTE-A and the LTE or the mobile station apparatus of the LTE-A can perform radio communication with the base station apparatuses of both the LTE-A and the LTE, and the LTE-A and the LTE use the same channel structure.

In the LTE-A, a technology (also referred to as Spectrum aggregation, Carrier aggregation, Frequency aggregation or the like) is suggested in which a plurality of frequency bands (hereinafter referred to as "Carrier Components (CC)" or "Component Carriers (CC)" of the same channel structure as the LTE are used, and they are used as one frequency band (broadband frequency band). For example, in the communication using the spectrum aggregation, the base station apparatus arranges one PDSCH in each Downlink Component Carrier (DL CC), and simultaneously transmits a plurality of PDSCHs to the mobile station apparatus.

In the spectrum aggregation, one Primary cell (Pcell) and one or a plurality of Secondary cells (Scell) are configured. The primary cell is a cell that is provided by a Downlink Primary Component Carrier (DL PCC) and an Uplink Primary Component Carrier (UL PCC). The primary cell is a cell that has the function equivalent to that of the cell of the LTE. One DL PCC and one UL PCC are set for each mobile station apparatus.

The secondary cell is a cell that is provided by a Downlink Secondary Component Carrier (DL SCC) and an Uplink Secondary Component Carrier (UL SCC). The secondary cell may be provided by the DL SCC alone. The secondary cell is a cell whose function is limited as compared with the primary cell. All DL CCs other than the DL PCCs are the DL SCCs. All Uplink Component Carriers (UL CCs) other than the UL PCCs are the UL SCCs.

In the LTE-A, an examination is being performed in which, when a plurality of ACK/NACKs for each of a plurality of PDSCHs received simultaneously by the mobile station apparatus are transmitted to the base station apparatus, uplink data (an information channel in a higher layer) (Uplink Shared Channel: UL-SCH) and a plurality of ACK/NACKs are transmitted together by using one of a plurality of PUSCHs transmitted by the mobile station apparatus (Non-patent document 1).

Non-patent document 2 discloses a method of coding, when a plurality of ACK/NACKs for a plurality of PDSCHs are transmitted in the same PUSCH, all ACK/NACKs together and the coding them for each cell (DL CC) corresponding to the ACK/NACK. The Non-patent document 2 discloses that, even when a plurality of DL CCs are allocated to the mobile station apparatus, if the mobile station apparatus receives only Downlink Control Information (DCI) indicating the allocation of the PDSCH of the primary cell, the mobile station apparatus utilizes the transmission method of the LTE to transmit the uplink data and the ACK/NACK together in the PUSCH. The downlink control information indicating the allocation of the PDSCH is referred to as a downlink assignment (DL assignment).

In the uplink of the LTE-A, it is considered that spatial multiplexing which uses MIMO SM (Multiple Input Multiple Output Spatial Multiplexing) to further enhance the throughput from the LTE is utilized. Specifically, transmission of the uplink data on two or more sequences of spatial multiplexing (hereinafter referred to as ranks) is realized.

By contrast, on the uplink control information in which high quality is required such as the ACK/NACK or RI (Rank Indicator), it is suggested that transmission sequences for all domains (hereinafter referred to as layers) to be subjected to spatial multiplexing are replicated, and thus communication in rank 1 is imaginarily realized. In other words, communication is performed such that uplink data communication in rank 2 or more and the communication of the ACK/NACK or the RI in rank 1 are present in a mixed manner. With respect to this, Non-patent document 3 suggests that, as a method of replicating and producing control information, a bit sequence after channel coding is allocated to each layer.

PRIOR ART DOCUMENT

Non-Patent Document

Non-patent document 1: "UCI Transmission in the Presence of UL-SCH Data", 3GPP TSG RAN WG1 Meeting #61, R1-103067, May 10-14, 2010.

Non-patent document 2: "ACK/NACK multiplexing schemes on PUSCH", 3GPP TSG RAN WG1 Meeting #61bis, R1-103760, 28 Jun.-2 Jul. 2010.

Non-patent document 3: "Performance evaluation of UCI multiplexing schemes on PUSCH in case of SU-MIMO", 3GPP TSG RAN WG1 Meeting #61, R1-102962, May 10-14, 2010.

DISCLOSURE OF THE INVENTION

Problems to be Solved by the Invention

Disadvantageously, however, in the conventional technology, when ACK/NACKs for a plurality of PDSCHs received by the mobile station apparatus in a plurality of DL CCs are transmitted in one physical uplink channel, the mobile station apparatus cannot efficiently code the ACK/NACKs and transmit them.

The present invention is made in view of the foregoing problem; the present invention has an object to provide a mobile station apparatus, a base station apparatus, wireless communication system, a wireless communication method and an integrated circuit in which, when ACK/NACKs for a plurality of PDSCHs received by the mobile station apparatus in a plurality of DL CCs are transmitted in one physical uplink channel, the mobile station apparatus can efficiently code the ACK/NACKs and transmit them, and the base station apparatus can perform reception processing on the ACK/NACKs transmitted by the mobile station apparatus.

Means for Solving the Problems (1) To achieve the above object, the following means are performed in the present invention. Specifically, according to the present invention, there is provided a mobile station apparatus transmitting a plurality of ACK/NACKs for transport blocks transmitted by a base station apparatus in a plurality of component carriers to the base station apparatus, in which first ACK/NACKs and second ACK/NACKs are individually coded, repetition processing is performed on coded bits of the first ACK/NACKs until the number of coded bits of the first ACK/NACKs reaches a first value, the repetition processing is performed on the coded bits of the second ACK/NACKs until the number of coded bits of the second ACK/NACKs reaches a second value, the coded bits of the first ACK/NACKs on which the repetition processing has been performed and the coded bits of the second ACK/NACKs on which the repetition processing has been performed are concatenated, and the first ACK/NACKs and the second ACK/NACKs are transmitted to the base station apparatus using one physical uplink channel.

(2) Moreover, in the mobile station apparatus of the present invention, the physical uplink channel is a physical uplink shared channel, and the first value and the second value are a positive integral multiple of an order of modulation used for the physical uplink shared channel.

(3) Furthermore, in the mobile station apparatus of the present invention, in case that the coded bits of the first ACK/NACKs is lower than the first value, the repetition processing is processing that repeatedly concatenates the coded bits of the first ACK/NACKs from the head.

(4) Moreover, in the mobile station apparatus of the present invention, in case that the coded bits of the second ACK/NACKs is lower than the second value, the repetition processing is processing that repeatedly concatenates the coded bits of the second ACK/NACKs from the head.

(5) Furthermore, in the mobile station apparatus of the present invention, in case that the coded bits of the first ACK/NACKs is larger than the first value, the repetition processing is processing that cuts off the coded bits of the first ACK/NACKs from the head to the first value.

(6) Moreover, in the mobile station apparatus of the present invention, in case that the coded bits of the second ACK/NACKs is larger than the second value, the repetition processing is processing that cuts off the coded bits of the second ACK/NACKs from the head to the second value.

(7) Furthermore, according to the present invention, there is provided a base station apparatus receiving a plurality of ACK/NACKs for transport blocks transmitted to a mobile station apparatus in a plurality of component carriers from the mobile station apparatus, in which first ACK/NACKs and second ACK/NACKs that are individually coded are received from the mobile station apparatus using one physical uplink channel, repetition processing is performed on coded bits of the first ACK/NACKs until the number of coded bits of the first ACK/NACKs reaches a first value by the mobile station apparatus, the repetition processing is performed on the coded bits of the second ACK/NACKs until the number of coded bits of the second ACK/NACKs reaches a second value by the mobile station apparatus, and the coded bits of the first ACK/NACKs on which the repetition processing has been performed and the coded bits of the second ACK/NACKs on which the repetition processing has been performed are concatenated by the mobile station apparatus.

(8) Moreover, in the base station apparatus of the present invention, the physical uplink channel is a physical uplink shared channel, and the first value and the second value are a positive integral multiple of an order of modulation used in the physical uplink shared channel.

(9) Furthermore, in the base station apparatus of the present invention, in case that the coded bits of the first ACK/NACKs is lower than the first value, the repetition processing is processing that repeatedly concatenates the coded bits of the first ACK/NACKs from the head.

(10) Moreover, in the base station apparatus of the present invention, in case that the coded bits of the second ACK/NACKs is lower than the second value, the repetition processing is processing that repeatedly concatenates the coded bits of the second ACK/NACKs from the head.

(11) Furthermore, in the base station apparatus of the present invention, in case that the coded bits of the first ACK/NACKs is larger than the first value, the repetition processing is processing that cuts off the coded bits of the first ACK/NACKs from the head to the first value.

(12) Moreover, in the base station apparatus of the present invention, in case that the coded bits of the second ACK/NACKs is larger than the second value, the repetition processing is processing that cuts off the coded bits of the second ACK/NACKs from the head to the second value.

(13) Furthermore, according to the present invention, there is provided a wireless communication system in which a mobile station apparatus transmits a plurality of ACK/NACKs for transport blocks transmitted by a base station apparatus in a plurality of component carriers to the base station apparatus, in which the mobile station apparatus individually codes first ACK/NACKs and second ACK/NACKs, performs repetition processing on coded bits of the first ACK/NACKs until the number of coded bits of the first ACK/NACKs reaches a first value, performs the repetition processing on the coded bits of the second ACK/NACKs until the number of coded bits of the second ACK/NACKs reaches a second value, concatenates the coded bits of the first ACK/NACKs on which the repetition processing has been performed and the coded bits of the second ACK/NACKs on which the repetition processing has been performed, and transmits the first ACK/NACKs and the second ACK/NACKs to the base station apparatus using one physical uplink channel, in which the base station apparatus receives the first ACK/NACKs and the second ACK/NACKs from the mobile station apparatus using the one physical uplink channel.

(14) In addition, according to the present invention, there is provided a wireless communication method used by a mobile station apparatus transmitting a plurality of ACK/NACKs for transport blocks transmitted by a base station apparatus in a plurality of component carriers to the base station apparatus, in which first ACK/NACKs and second ACK/NACKs are individually coded, repetition processing is performed on coded bits of the first ACK/NACKs until the number of coded bits of the first ACK/NACKs reaches a first value, the repetition processing is performed on the coded bits of the second ACK/NACKs until the number of coded bits of the second ACK/NACKs reaches a second value, the coded bits of the first ACK/NACKs on which the repetition processing has been performed and the coded bits of the second ACK/NACKs on which the repetition processing has been performed are concatenated, and the first ACK/NACKs and the second ACK/NACKs are transmitted to the base station apparatus using one physical uplink channel.

(15) Furthermore, in the wireless communication method of the present invention, the physical uplink channel is a physical uplink shared channel, and the first value and the second value are a positive integral multiple of an order of modulation used for the physical uplink shared channel.

(16) Moreover, according to the present invention, there is provided a wireless communication method used by a base station apparatus receiving a plurality of ACK/NACKs for transport blocks transmitted to the base station apparatus in a plurality of component carriers from the mobile station apparatus, in which first ACK/NACKs and second ACK/NACKs that are individually coded are received from the mobile station apparatus using one physical uplink channel, repetition processing is performed on coded bits of the first ACK/NACKs until the number of coded bits of the first ACK/NACKs reaches a first value by the mobile station apparatus, the repetition processing is performed on the coded bits of the second ACK/NACKs until the number of coded bits of the second ACK/NACKs reaches a second value by the mobile station apparatus, and the coded bits of the first ACK/NACKs on which the repetition processing has been performed and the coded bits of the second ACK/NACKs on which the repetition processing has been performed are concatenated by the mobile station apparatus.

(17) Furthermore, in the wireless communication method of the present invention, the physical uplink channel is a physical uplink shared channel, and the first value and the second value are a positive integral multiple of an order of modulation used for the physical uplink shared channel.

(18) Moreover, according to the present invention, there is provided an integrated circuit used by a mobile station apparatus transmitting a plurality of ACK/NACKs for transport blocks transmitted by a base station apparatus in a plurality of component carriers to the base station apparatus, in which the mobile station apparatus is made to achieve a series of functions of: individually coding first ACK/NACKs and second ACK/NACKs; performing repetition processing on coded bits of the first ACK/NACKs until the number of coded bits of the first ACK/NACKs reaches a first value; performing the repetition processing on the coded bits of the second ACK/NACKs until the number of coded bits of the second ACK/NACK reaches a second value; concatenating the coded bits of the first ACK/NACKs on which the repetition processing has been performed and the coded bits of the second ACK/NACKs on which the repetition processing has been performed; and transmitting the first ACK/NACKs and the second ACK/NACKs to the base station apparatus using one physical uplink channel.

(19) Furthermore, in the integrated circuit of the present invention, the physical uplink channel is a physical uplink shared channel, and the first value and the second value are a positive integral multiple of an order of modulation used for the physical uplink shared channel.

(20) Moreover, according to the present invention, there is provided an integrated circuit used by a base station apparatus receiving a plurality of ACK/NACKs for transport blocks transmitted to a mobile station apparatus in a plurality of component carriers from the mobile station apparatus, in which the base station apparatus is made to achieve a function of receiving first ACK/NACKs and second ACK/NACKs that are individually coded from the mobile station apparatus using one physical uplink channel, repetition processing is performed on coded bits of the first ACK/NACKs until the number of coded bits of the first ACK/NACKs reaches a first value by the mobile station apparatus, the repetition processing is performed on the coded bits of the second ACK/NACKs until the number of coded bits of the second ACK/NACKs reaches a second value by the mobile station apparatus, and the coded bits of the first ACK/NACKs on which the repetition processing has been performed and the coded bits of the second ACK/NACKs on which the repetition processing has been performed are concatenated by the mobile station apparatus.

(21) Furthermore, in the integrated circuit of the present invention, the physical uplink channel is a physical uplink shared channel, and the first value and the second value are a positive integral multiple of an order of modulation used for the physical uplink shared channel.

Effect of the Invention

According to the present invention, in case that a mobile station apparatus transmits ACK/NACKs for a plurality of PDSCHs received in a plurality of DL CCs in one physical uplink channel, the mobile station apparatus can efficiently code and transmit the ACK/NACKs.

BEST MODES FOR CARRYING OUT THE INVENTION

An embodiment of the present invention will be described in detail below with reference to accompanying drawings.

The physical channels of the present invention will first be described.

Figure 1:
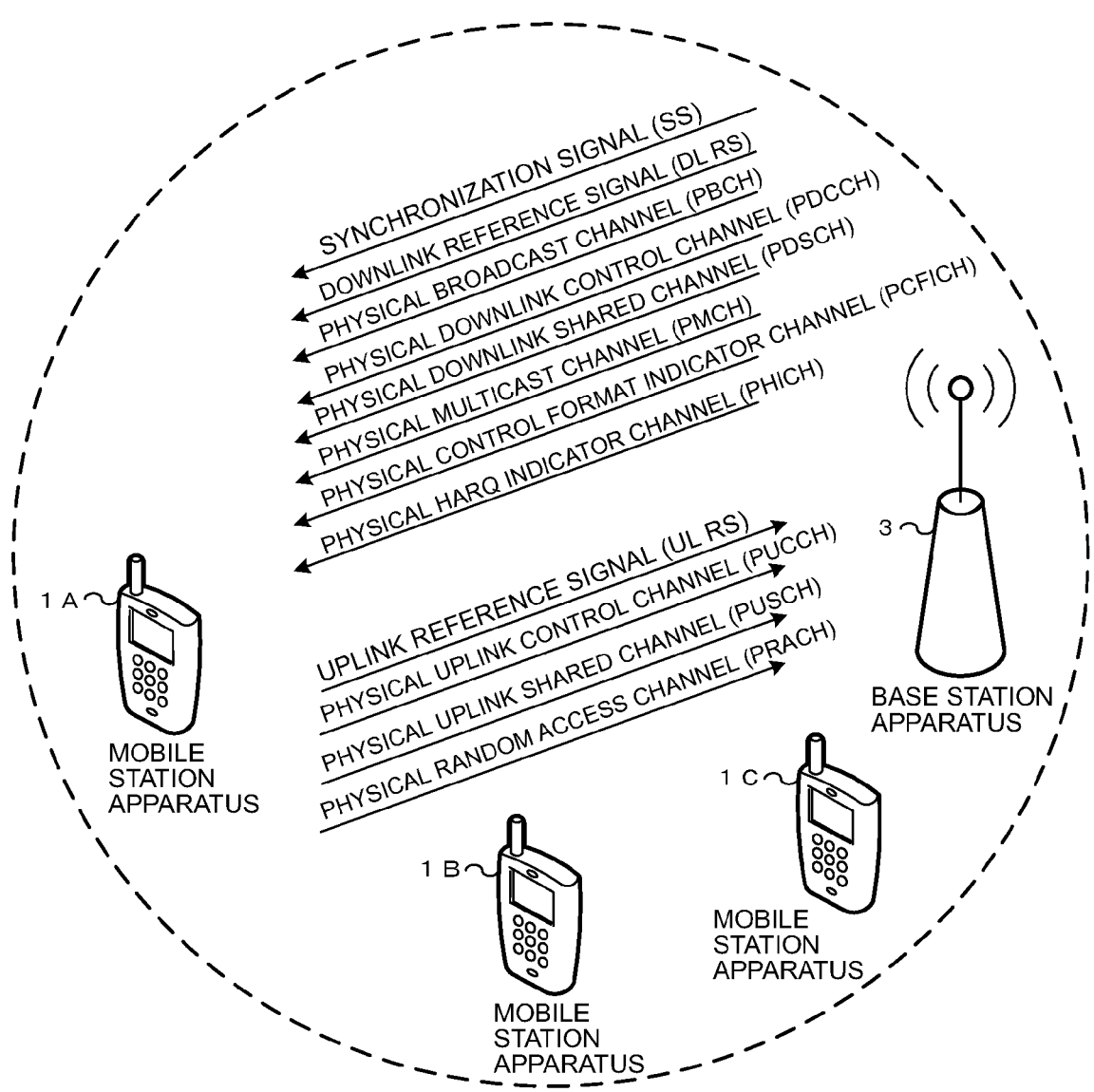
FIG. 1 is a conceptual diagram of a wireless communication system according to the present invention.

FIG. 1 is a conceptual diagram of a wireless communication system according to the present invention. In FIG. 1, the wireless communication system includes mobile station apparatuses 1A to 1C and a base station apparatus 3. FIG. 1 shows that, in radio communication (downlink) from the base station apparatus 3 to the mobile station apparatuses 1A to 1C, a Synchronization signal (SS), a Downlink reference signal (DL RS), a Physical Broadcast Channel (PBCH), a Physical Downlink Control Channel (PDCCH), a Physical Downlink Shared Channel (PDSCH), a Physical Multicast Channel (PMCH), a Physical Control Format Indicator Channel (PCFICH) and a Physical Hybrid ARQ Indictor Channel (PHICH) are allocated.

FIG. 1 shows that, in radio communication (uplink) from the mobile station apparatuses 1A to 1C to the base station apparatus 3, an Uplink Reference Signal (UL RS), a Physical Uplink Control Channel (PUCCH), a Physical Uplink Shared Channel (PUSCH) and a Physical Random Access Channel (PRACH) are allocated. Hereinafter, the mobile station apparatuses 1A to 1C are referred to as the mobile station apparatus 1.

The synchronization signal is a signal that is used for the mobile station apparatus 1 to synchronize downlink frequency domains and time domains. The downlink reference signal is a signal that is used for the mobile station apparatus 1 to synchronize the downlink frequency domains and the time domains, is used for the mobile station apparatus 1 to measure the reception quality of the downlink or is used for the mobile station apparatus 1 to perform the channel compensation of the PDSCH and the PDCCH.

The PBCH is a physical channel that is used to broadcast a control parameter (system information) (Broadcast Channel: BCH) used in common in the mobile station apparatus 1. The PBCH is transmitted at intervals of 40 ms. The timing of the intervals of 40 ms is subjected to blind detection in the mobile station apparatus 1.

The PDCCH is a physical channel that is used to transmit Downlink Control Information (DCI) such as downlink assignment (also referred to as downlink grant) and uplink grant. The downlink assignment is formed with information (Modulation and Coding Scheme: MCS) on the modulation scheme and the coding rate of the PDSCH, information indicating the allocation of radio resources and the like. The uplink grant is formed with information on the modulation scheme and the coding rate of the PUSCH (uplink data transmission channel), information indicating the allocation of radio resources and the like.

A plurality of formats is used for the downlink control information. The format for the downlink control information is referred to as a DCI format. As the DCI format of the downlink assignment, a DCI format 1A that is used for the base station apparatus 3 to transmit the PDSCH using one transmission antenna port or transmission diversity, a DCI format 2 that is used for the base station apparatus 3 to transmit a plurality of pieces of downlink data to the PDSCH using MIMO SM (Multiple Input Multiple Output Spatial Multiplexing) and the like are prepared.

The MIMO SM is a technology in which, for a plurality of spatial dimension channels realized by a plurality of transmission antenna ports and a plurality of reception antenna ports, a plurality of signals are multiplexed and exchanged. Here, the antenna port indicates a logical antenna that is used for signal processing; one antenna port may be formed with one physical antenna or a plurality of physical antennas. On the side of transmission using the MIMO SM, processing (referred to as precoding) for forming an appropriate spatial channel for a plurality of signals is performed, and the signals on which the precoding processing has been performed are transmitted using a plurality of transmission antennas. On the side of reception using the MIMO SM, processing for appropriately demultiplexing signals multiplexed in the spatial dimension channel for a plurality of signals received using a plurality of reception antennas is performed.

The PDSCH is a physical channel that is used to transmit system information that are not broadcast on the PBCH, that is, system information other than the BCH, and used to transmit paging information (Paging Channel: PCH) and downlink data (Downlink Shared Channel: DL-SCH). The PMCH is a physical channel that is used to transmit information (Multicast Channel: MCH) on MBMS (Multimedia Broadcast and Multicast Service).

The PCFICH is a physical channel that is used to transmit information indicating a domain where the PDCCH is arranged. The PHICH is a physical channel that is used to transmit a HARQ indicator which indicates whether or not uplink data (Uplink Shared Channel: UL-SCH) received by the base station apparatus 3 is successfully decoded.

When the base station apparatus 3 successfully decodes all uplink data included in the PUSCH, the HARQ indicator indicates ACK (ACKnowledgement) whereas, when the base station apparatus 3 fails to decode at least one piece of uplink data included in the PUSCH, the HARQ indicator indicates NACK (Negative ACKnowledement). A plurality of HARQ indicators indicating whether or not decoding is successfully performed for each of a plurality of pieces of uplink data included in the same PUSCH may be transmitted in a plurality of PHICHs.

The uplink reference signal is a signal that is used for the base station apparatus 3 to synchronize the uplink time domains, is used for the base station apparatus 3 to measure the reception quality of the uplink or is used for the base station apparatus 3 to perform the channel compensation of the PUSCH and the PUCCH. For the uplink reference signal, in radio resources divided assuming the SC-FDMA, code spreading using a CAZAC (Constant Amplitude and Zero Auto-Correlation) sequence is performed.

The CAZAC sequence is a sequence that is superior in constant amplitude and autocorrelation characteristic in the time domain and the frequency domain. Since it has a constant amplitude in the time domain, it is possible to lower a PAPR (Peak to Average Power Ratio). In the time domain, cyclic delay is applied to the DMRS. The cyclic delay in the time domain is referred to as acyclic shift. The cyclic shift corresponds to the phase rotation of the CAZAC sequence in the frequency domain for each subcarrier.

As the uplink reference signal, there are a DMRS (Demodulation Reference Signal) that is time-multiplexed with the PUSCH or the PUCCH and is transmitted and that is used to compensate for the channel of the PUSCH and the PUCCH, and an SRS (Sounding Reference Signal) that is transmitted independently of the PUSCH and the PUCCH and that is used for the base station apparatus 3 to estimate the conditions of the uplink channel. For the DMRS, not only the cyclic shift but also a spreading code (Orthogonal Cover Code: OCC) in the time domain is used.

The PUCCH is a physical channel that is used to transmit Uplink Control Information (UCI) which is information used for control of communication, such as Channel Quality Information indicating the channel quality of the downlink, Scheduling Request (SR) indicting the request of the allocation of uplink radio resources and the ACK/NACK indicating whether or not downlink data received by the mobile station apparatus 1 is successfully decoded.

The PUSCH is a physical channel that is used to transmit uplink data and uplink control information. If the radio resources of the PUSCH are not allocated when the mobile station apparatus transmits the uplink control information, the uplink control information is transmitted in the PUCCH.

If the radio resources of the PUSCH are allocated when the mobile station apparatus transmits the uplink control information, the uplink control information is transmitted in the PUSCH. If the radio resources of a plurality of PUSCHs are allocated, the uplink control information is transmitted in only any one of the PUSCHs.

The PRACH is a physical channel that is used to transmit a random access preamble. The largest purpose of the PRACH is for the mobile station apparatus 1 to synchronize the time domain with the base station apparatus 3; in addition, the PRACH is used for initial access, handover, a reconnection request and the request of the allocation of uplink radio resources.

The spectrum aggregation of the present invention will be described below.

Figure 2:
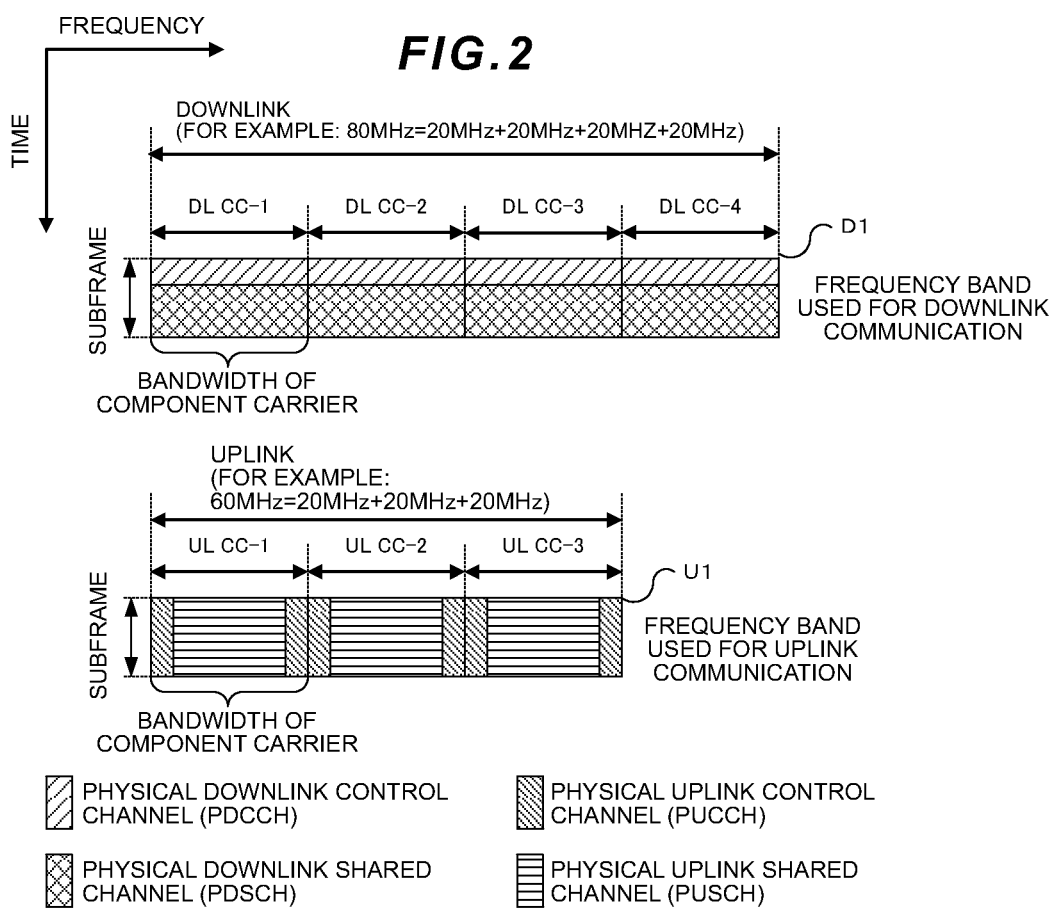
FIG. 2 is a diagram showing an example of spectrum aggregation processing according to the present invention.

FIG. 2 is a diagram showing an example of the spectrum aggregation processing according to the present invention. In FIG. 2, the horizontal axis indicates the frequency domain, and the vertical axis indicates the time domain. As shown in FIG. 2, a downlink subframe D1 is formed with four downlink Component Carriers (DL CC-1; Downlink Component Carrier-1, DL CC-2, DL CC-3, DL CC-4) having a bandwidth of 20 MHz.

In each of the subframes of DL CCs, a domain which is indicated by an obliquely hatched domain and in which the PHICHs, the PCFICH and the PDCCHs are arranged and a domain which is indicated by a mesh-hatched domain and in which the PDSCHs is arranged are present. The PHICH, the PCFICH and the PDCCH are frequency-multiplexed and/or time-multiplexed. The domain where the PHICHs, the PCFICH and the PDCCHs are frequency-multiplexed and/or time-multiplexed is time-multiplexed with the domain where the PDSCHs is arranged.

An uplink subframe U1 is formed with three Uplink Component Carriers (UL CC-1; Uplink Component Carrier-1, UL CC-2, UL CC-3) having a bandwidth of 20 MHz. In each of the subframes of UL CCs, a domain which is indicated by a rightwardly downward hatched domain and in which the PUCCHs is arranged and a domain which is indicated by a horizontally hatched domain and in which the PUSCHs is arranged are frequency-multiplexed.

The mobile station apparatus 1 first uses any one pair of a DL CC and an UL CC to perform initial access with the base station apparatus 3. The base station apparatus 3 notifies, with a RRC signal (Radio Resource Control Signal) transmitted using the PDSCH of the DL CC on which the mobile station apparatus 1 performs initial access, the DL CCs and UL CCs (hereinafter referred to as "set (uplink/downlink) component carrier (configured (downlink/uplink) component carrier")) that is set for the mobile station apparatus 1.

The base station apparatus 3 uses the PDCCH, MAC (Medium Access Control) CE (Control Element) or the like to notify an activation command indicating one or more DL CC among the set DL CCs that is used for downlink communication and/or one or more UL CC among the set UL CCs that is used for uplink communication.

That the base station apparatus 3 notifies the mobile station apparatus 1 of the use of the CC with the activation command for communication is referred to as activating the CC. That the base station apparatus 3 notifies the mobile station apparatus 1 of the disuse of the CC with the activation command for communication is referred to as deactivating the CC.

The base station apparatus 3 sets, for each mobile station apparatus 1, one Downlink Primary Component Carrier (DL PCC) (first downlink component carrier) among the set DL CCs, and sets, for each mobile station apparatus 1, one Uplink Primary Component Carrier (UL PCC) among the set UL CCs and notifies the mobile station apparatus 1 of the RRC signal including information on the setting.

The DL CC other than the DL PCC is a Downlink Secondary Component Carrier (DL SCC) (second downlink component carrier). The UL CC other than the UL PCC is an Uplink Secondary Component Carrier (UL SCC). In the spectrum aggregation, one Primary cell (Pcell) and one or a plurality of Secondary cells (Scell) are configured. The primary cell is a cell that is provided by one DL PCC and one UL PCC. The primary cell is a cell that has the function equivalent to that of the cell of the LTE.

The secondary cell is a cell that is provided by one DL SCC and one UL SCC. The secondary cell may be provided by the DL SCC alone. The secondary cell is a cell whose function is limited as compared with the primary cell.

The DL PCC and the UL PCC are not deactivated. The uplink control information is transmitted in the PUCCH of the UL PCC and/or the PUSCH of any one of the set UL CCs.

The configuration of a radio frame according to the present invention will be described below.

Figure 3:
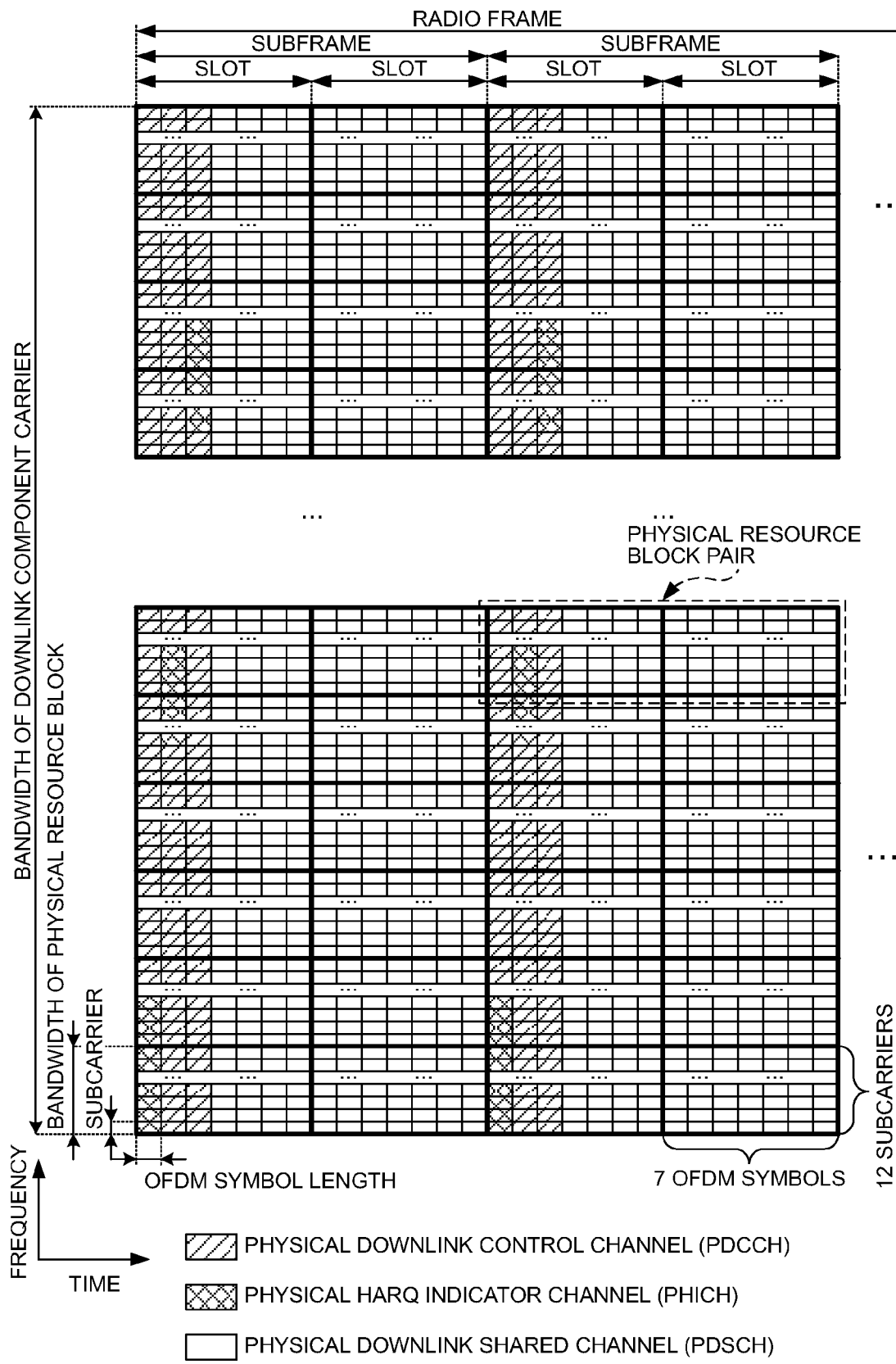
FIG. 3 is a schematic diagram showing an example of the configuration of a downlink radio frame according to the present invention.

FIG. 3 is a schematic diagram showing an example of the configuration of a downlink radio frame according to the present invention. In FIG. 3, the horizontal axis is a time domain, and the vertical axis is a frequency domain. As shown in FIG. 3, the radio frame of the DL CC is formed with a plurality of downlink Physical Resource Block (PRB) pairs (for example, a domain surrounded by broken lines in FIG. 3). This downlink physical resource block pair is a unit such as for the allocation of radio resources, and is formed with a frequency band (PRB bandwidth; 180 kHz) of a predetermined width and a time band (two slots=one subframe; 1 ms).

One downlink physical resource block pair is formed with two downlink physical resource blocks (PRB bandwidth x slot) contiguous in the time domain. One downlink physical resource block (in FIG. 3, a unit surrounded by thick lines) is formed with 12 subcarriers (15 kHz) in the frequency domain, and is formed with 7 OFDM (Orthogonal Frequency Division Multiplexing) symbols (71 μs) in the time domain.

In the time domain, a slot (0.5 ms) formed with 7 OFDM symbols (71 μs), a subframe (1 ms) formed with two slots and a radio frame (10 ms) formed with 10 subframes are present. A time interval of 1 ms equal to that of the subframe is also referred to as a Transmit Time Interval (TTI). In the frequency domain, a plurality of downlink physical resource blocks is arranged according to the bandwidth of the DL CC. A unit formed with one subcarrier and one OFDM symbol is referred to as a downlink resource element.

The arrangement of physical channels allocated in the downlink will be described below. In each of the downlink subframes, the PDCCH, the PCFICH, the PHICH, the PDSCH, the downlink reference signal and the like are arranged. The PDCCH is arranged from the OFDM symbol (in FIG. 3, a leftward obliquely hatched domain) that is the head of the subframe. The number of OFDM symbols where the PDCCH is arranged differs from one subframe to another; information indicating the number of OFDM symbols where the PDCCH is arranged is notified in the PCFICH. In each subframe, a plurality of PDCCHs is frequency-multiplexed and time-multiplexed.

The PCFICH is arranged in the OFDM symbol that is the head of the subframe, and is frequency-multiplexed with the PDCCH. The PHICH is frequency-multiplexed within the same OFDM symbol as the PDCCH (in FIG. 3, a mesh-hatched domain). The PHICH may be arranged in only the OFDM symbol that is the head of the subframe or may be dispersed in a plurality of OFDM symbols where the PDCCH is arranged. In each subframe, a plurality of PHICHs is frequency-multiplexed and code-multiplexed.

In the PHICH of the downlink subframe a predetermined time after the transmission of the PUSCH (for example, after 4 ms, after 4 subframes or after 4 TTIs), the mobile station apparatus 1 receives HARQ feedback for this PUSCH.

The PDSCH is arranged in the OFDM symbols (in FIG. 3, the domain that is not hatched) other than the OFDM symbols where the PDCCH, the PCFICH and the PHICH are arranged within the subframe. The allocation of the radio resources for the PDSCH is indicated for the mobile station apparatus 1 with the downlink assignment. In the time domain, the radio resources for PDSCH are arranged in the same downlink subframe where the PDCCH including the downlink assignment indicating the allocation of the PDSCH is arranged.

The PDSCH and the PDCCH for the PDSCH are arranged in the same or a different downlink component carrier. In the subframe of each downlink component carrier, a plurality of PDSCHs is frequency-multiplexed and spatially multiplexed. For ease of description, the downlink reference signal is not shown in FIG. 3; the downlink reference signal is dispersed in the frequency domain and the time domain.

Figure 4:
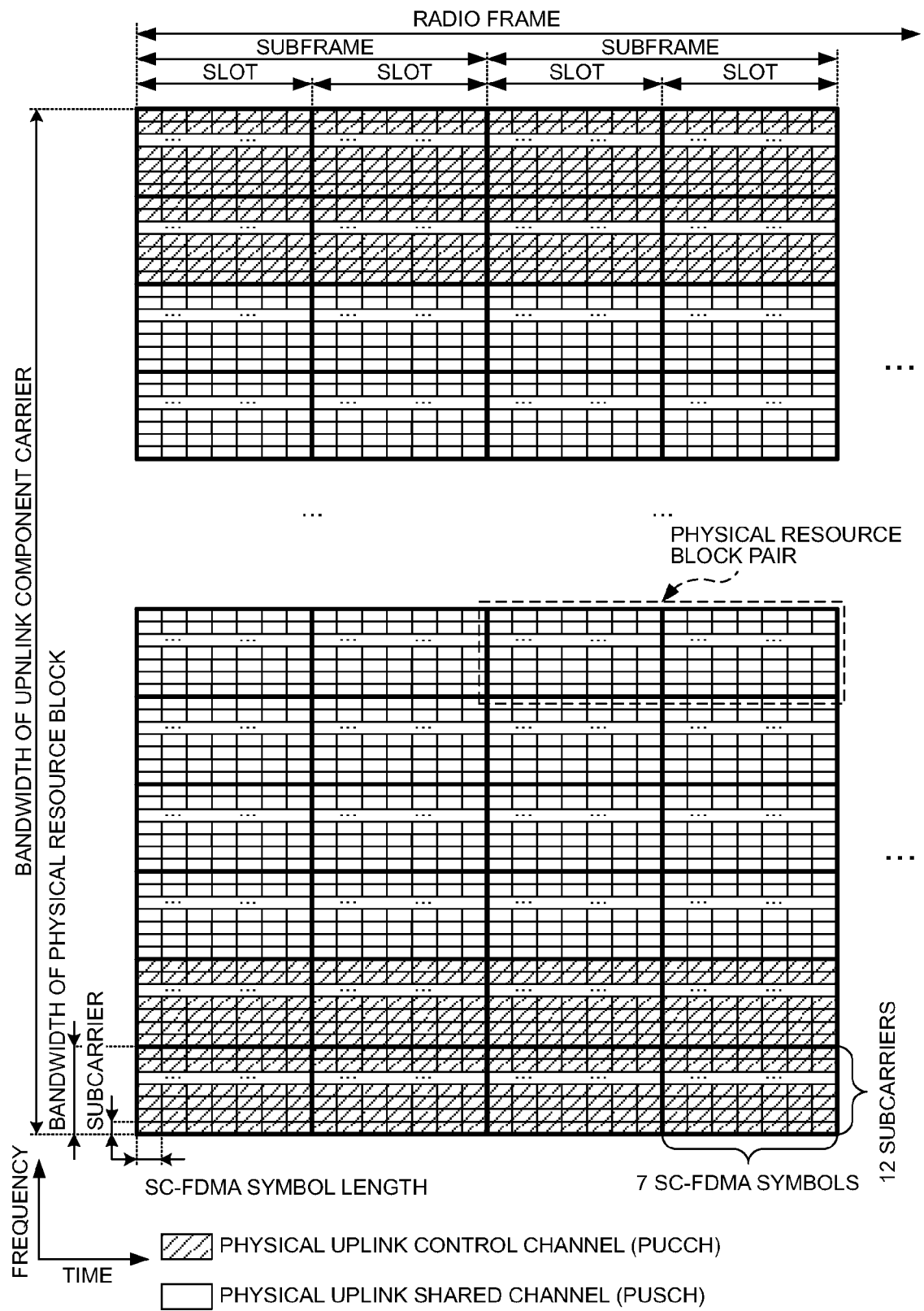
FIG. 4 is a schematic diagram showing an example of the configuration of an uplink radio frame according to the present invention.

FIG. 4 is a schematic diagram showing an example of the configuration of an uplink radio frame according to the present invention. In FIG. 4, the horizontal axis is a time domain, and the vertical axis is a frequency domain. As shown in FIG. 4, the radio frame of the UL CC is formed with a plurality of uplink physical resource block pairs (for example, a domain surrounded by broken lines in FIG. 4). This uplink physical resource block pair is a unit such as for the allocation of radio resources, and is formed with a frequency band (PRB bandwidth; 180 kHz) of a predetermined width and a time band (two slots=one subframe; 1 ms).

One uplink physical resource block pair is formed with two uplink physical resource blocks (PRB bandwidth×slot) contiguous in the time domain. One uplink physical resource block (in FIG. 4, a unit surrounded by thick lines) is formed with 12 subcarriers in the frequency domain, and is formed with 7 SC-FDMA symbols (71 μs) in the time domain.

In the time domain, a slot (0.5 ms) formed with 7 SC-FDMA (Single-Carrier Frequency Division Multiple Access) symbols (71 μs), a subframe (1 ms) formed with two slots and a radio frame (10 ms) formed with 10 subframes are present. A time interval of 1 ms equal to that of the subframe is also referred to as a Transmit Time Interval (TTI). In the frequency domain, a plurality of uplink physical resource blocks is arranged according to the bandwidth of the UL CC. A unit formed with one subcarrier and one SC-FDMA symbol is referred to as an uplink resource element.

Physical channels allocated within the uplink radio frame will be described below. In each uplink subframe, the PUCCH, the PUSCH, the PRACH, the uplink reference signal and the like are arranged. The PUCCH is arranged in the uplink physical resource block (a leftward obliquely hatched domain) at each end of the uplink band. In each subframe, a plurality of PUCCHs is frequency-multiplexed and code-multiplexed.

The PUSCH is arranged in the uplink physical resource block pairs (the domain that is not hatched) other than the uplink physical resource blocks where the PUCCH is arranged. The radio resources of the PUSCH are allocated using the uplink grant, and are arranged in the uplink subframe a predetermined time after the downlink subframe where the PDCCH including the uplink grant is arranged (for example, after 4 ms, after 4 subframes or after 4 TTIs). In each subframe, a plurality of PUSCHs is frequency-multiplexed and spatially multiplexed.

Information indicating the subframe where the PRACH is arranged and the uplink physical resource block is notified by the base station apparatus. The uplink reference signal is time-multiplexed with the PUCCH and the PUSCH. For example, the DMRS that is time-multiplexed with the PUSCH is arranged in the SC-FDMA symbols that are the fourth and eleventh symbols within the subframe.

The uplink reference signal is time-multiplexed with the PUSCH and the PUCCH, and is transmitted. When the PUSCH is time-multiplexed with the uplink reference signal, the uplink reference signal is arranged in the same frequency band as that where the PUSCH is allocated in the frequency domain, and is arranged in the SC-FDMA symbols that are the fourth and eleventh symbols in the time domain.

The arrangement of the uplink data and the uplink control information within the PUSCH in the present invention will be described below.

Figure 5:
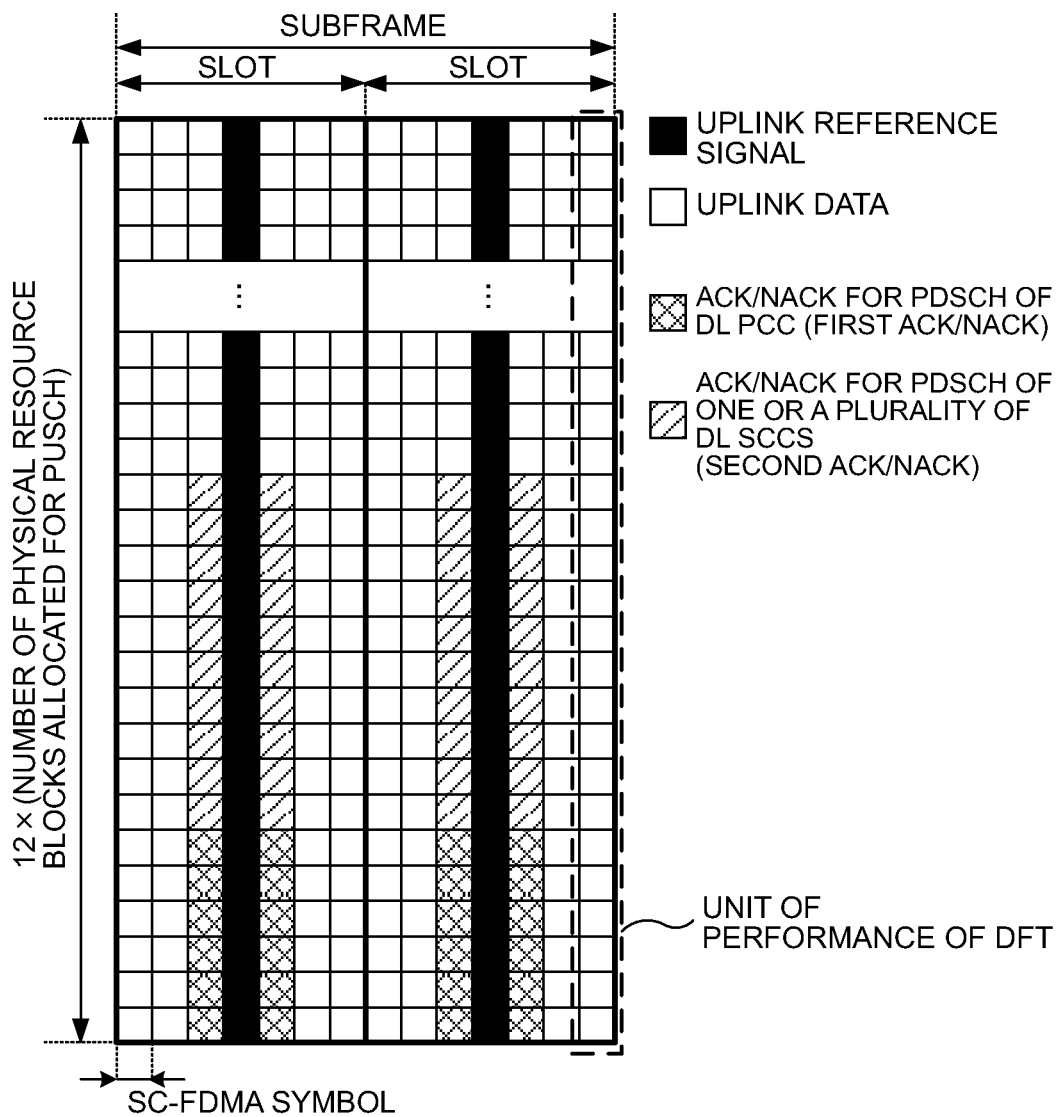
FIG. 5 is a diagram illustrating a method of simultaneously transmitting uplink data and ACK/NACKs in a PUSCH in the present invention.

FIG. 5 is a diagram illustrating a method of simultaneously transmitting the uplink data and the ACK/NACKs in the PUSCH in the present invention. In FIG. 5, the horizontal axis is a time domain, and the vertical axis represents the alignment of modulation symbol sequences to be mapped; they do not correspond to the frequency axis, are DFT-processed for each of the SC-FDMA symbols and are mapped on the resources allocated on the frequency axis. The modulation symbols of the ACK/NACKs are arranged to the third, fifth, tenth and twelfth SC-FDMA symbols.

Hereinafter, the ACK/NACK for the PDSCH of the DL PCC is referred to as first ACK/NACKs (first response information), and the ACK/NACKs for the PDSCH of one or a plurality of DL SCCs is referred to as second ACK/NACKs (second response information). Specifically, it is indicated that, when attention is focused on the third SC-FDMA symbol, sequentially from below the third SC-FDMA symbol, modulation symbols for the first ACK/NACKs, modulation symbols for the second ACK/NACKs and modulation symbols for the uplink data are time-multiplexed in this order, and that it is converted by the DFT processing into the signal of the frequency domain and is thereafter arranged in the frequency domain (physical resource block) allocated in the uplink grant.

The uplink data, the first ACK/NACKs and the second ACK/NACKs are individually coded. What the coded bit sequence of the ACK/NACKs and the coded bit sequence of the uplink data are divided into the number of bits in the modulation order of the modulation scheme of the PUSCH is regarded as the modulation symbols (coded symbols), and they are modulated after being rearranged as shown in FIG. 5. For example, the modulation order is "2" in QPSK modulation, is "4" in 16QAM and is "6" in 64QAM.

Note that, when the mobile station apparatus 1 receives the PDSCH in the DL PCC alone, the modulation symbols of the second ACK/NACKs are not arranged, and the modulation symbols of the uplink data are arranged in the domain where the modulation symbols of the second ACK/NACKs are arranged in FIG. 5. Whether the second ACK/NACKs is present or not, the first ACK/NACK is subjected to the same coding, and is arranged in the same position in FIG. 5.

It should be noted that when the mobile station apparatus 1 does not receive the PDSCH in the DL PCC, and receives the PDSCH in at least one DL SCC, both the first ACK/NACKs and the second ACK/NACKs are transmitted in the PUSCH. Here, the first ACK/NACKs indicate NACK.

A method of calculating the number of bits of the ACK/NACK in the present invention will be described below.

In the present invention, the number of bits used when the ACK/NACKs are transmitted in the PUSCH is a value obtained by multiplying the number of DL CCs set by the mobile station apparatus 1 in the base station apparatus 3 by the maximum number of pieces of downlink data that can be spatially multiplexed with one PDSCH. When three DL CCs are set, and up to two pieces of downlink data can be spatially multiplexed with one PDSCH, the mobile station apparatus 1 generates the ACK/NACKS of six bits. That is, the ACK/NACK of one bit is generated for each piece of downlink data received by the DL CC.

Note that, when the PDSCH is received in the DL PCC alone, only the first ACK/NACKs are generated, and the second ACK/NACKs are not generated. Since, even when a plurality of DL CCs is set, the mobile station apparatus 1 performs communication only in the primary cell (DL PCC and UL PCC) for a large amount of time, the transmission of the ACK/NACKs for the DL SCC is prevented when the PDSCH is received in the DL PCC alone, and thus it is possible to efficiently use the radio resources of the PUSCH because it is not necessary to transmit the ACK/NACKs for the DL SCC even though the PDSCH is not received in the DL SCC.

It should be noted that when the mobile station apparatus 1 does not receive the PDSCH in the DL PCC, and receives the PDSCH in at least one DL SCC, both the first ACK/NACKs and the second ACK/NACKs are generated. In this way, it is not necessary to change the coding of the ACK/NACKs and the mapping of the modulation symbols of the ACK/NACKs depending on whether or not the PDSCH is received in the DL PCC, and thus it is possible to simplify the configuration of the mobile station apparatus 1.

Note that, when the mobile station apparatus 1 does not receive the PDSCH in the DL PCC, and receives the PDSCH in at least one DL SCC, only the second ACK/NACKs may be generated. In this case, the modulation symbols of the uplink data are arranged in the positions where the modulation symbols of the first ACK/NACKs are arranged in FIG. 5, and the modulation symbols of the second ACK/NACKs are arranged in the same positions as those when the first ACK/NACKs are present. Thus, whether the first ACK/NACKs are present or not, the modulation symbols of the second ACK/NACKs are arranged in the same positions. Hence, even when the PDSCH transmitted by the base station apparatus 3 in the DL PCC is not decoded by the mobile station apparatus 1, the base station apparatus 3 can properly receive the second ACK/NACKs.

It should be noted that when the PDSCH is received in at least one DL SCC, and the PDSCH is received in only part of the set DL CCs, among the set DL CCs, the ACK/NACK for the DL CCs in which the PDSCH is not received is set at NACK. When only one piece of downlink data is received in the PDSCH received in the set DL CCs, the ACK/NACK of one bit is generated for the DL CCs set as described above, and the ACK/NACK of the other bit is set at a predetermined value.

For example, when, in the mobile station apparatus 1, among three set DL CCs, the downlink data is not received in the DL PCC, two pieces of downlink data received in the first DL SCC are successfully decoded and one piece of downlink data received in the secondly set DL SCC fails to be decoded, the mobile station apparatus 1 generates "00" as the first ACK/NACK sequence, and "1100" as the second ACK/NACK sequence.

Note that, for ACK, the bit value is set at 1 whereas, for NACK, the bit value is set at 0. When, as described above, the mobile station apparatus 1 does not receive the downlink data in the set DL CC, the bit of the ACK/NACK is set at a predetermined value, and thus the base station apparatus 3 finds that the ACK/NACK for the DL CC in which the downlink data is not transmitted to the mobile station apparatus 1 is set at the predetermined value, with the result that the accuracy of reception of the ACK/NACK for the remaining downlink data transmitted to the mobile station apparatuses 1 is enhanced.

It should be noted that the mobile station apparatus 1 arranges the bits of the ACK/NACKs in the order of the numbers of the DL SCCs set for the individual DL SCCs, and thus the base station apparatus 3 can properly recognize that the bit of the ACK/NACK corresponds to which DL SCC the downlink data is transmitted in.

Note that, the number of bits of the ACK/NACKs may be determined from the number of DL CCs set to the mobile station apparatus 1 by the base station apparatus 3 and the maximum number of pieces of downlink data that can be spatially multiplexed with the PUSCH for each of the DL CCs. For example, the mobile station apparatus 1 where one DL CC that can be spatially multiplexed with two pieces of downlink data in the PUSCH and two DL CCs that can be multiplexed with only one piece of downlink data in the PDSCH are set, generates four bits of the ACK/NACKs.

It should be noted that the number of bits of the ACK/NACK may be set at a value obtained by multiplying the number of activated DL CCs by the maximum number of pieces of downlink data that can be spatially multiplexed with one PDSCH. The maximum number of pieces of downlink data that can be spatially multiplexed with the PDSCH for each of the DL CCs is determined from the transmission mode (for example, MIMO SM or transmission diversity) of the downlink data. The number of bits of the ACK/NACKs may be determined from the number of DL CCs that are activated.

A method of calculating the number of modulation symbols of the ACK/NACKs in the present invention will be described below.

In the present invention, the number of modulation symbols of the ACK/NACK used when the ACK/NACK is transmitted in the PUSCH is determined on the basis of the number of bits of the first ACK/NACKs transmitted in the PUSCH, the number of bits of the second ACK/NACKs, the amount of radio resource when the uplink data is initially transmitted, the number of bits of the uplink data (transport block size), an offset set by the base station apparatus 3 and the like. Formula (1) is a formula for calculating the number of modulation symbols of the ACK/NACKs used when the ACK/NACKs are transmitted in the PUSCH.

[Formula 1]

$$Q''' = \text{ceil}\left(\frac{O' \cdot M_{sc}^{PUSCH\text{-}initial} \cdot N_{symb}^{PUSCH\text{-}inital} \cdot \alpha_{offset}^{PUSCH}}{\sum_{r=0}^{C-1} K_r}\right) +$$

$$\text{ceil}\left(\frac{O'' \cdot M_{sc}^{PUSCH\text{-}initial} \cdot N_{symb}^{PUSCH\text{-}inital} \cdot \beta_{offset}^{PUSCH}}{\sum_{r=0}^{C-1} K_r}\right)$$

$$= Q' + Q''$$

Ceil(·): A function for rounding a parenthesized number up to an integer

O': The number of bits of the ACK/NACKs for a PDSCH in a DL PCC

O'': The number of bits of the ACK/NACKs for the PDSCH in a plurality of DL SCCs $M_{sc}^{PUSCH\text{-}initial}$: The number of subcarriers included in a frequency band allocated to the PUSCH at the time of the initial transmission $N_{sc}^{PUSCH\text{-}initial}$: The number of SC-FDMA symbols used for the transmission of the PUSCH at the time of the initial transmission $\alpha_{offset}^{PUSCH}$: The value of an offset for the first ACK/NACKs set by the base station apparatus 3

$\beta_{offset}^{PUSCH}$: The value of an offset for the second ACK/NACKs set by the base station apparatus 3

$$\sum_{r=0}^{C-1} K_r:$$

The number of bits of the uplink data transmitted in the PUSCH

Q' is the number of modulation symbols of the first ACK/NACKs. Q'' is the number of modulation symbols of the second ACK/NACKs. Q''' is the sum of the number of modulation symbols of the first ACK/NACKs and the number of modulation symbols of the second ACK/NACKs transmitted in the PUSCH.

O' is the number of bits of the first ACK/NACKs generated by the mobile station apparatus 1 according to the present invention. O'' is the number of bits of the second ACK/NACKs generated by the mobile station apparatus 1 according to the present invention. When the mobile station apparatus 1 receives the PDSCH in the DL PCC alone, O'' is set at "0".

The value of an offset set by the base station apparatus 3 is set for each of the first ACK/NACKs and the second ACK/NACKs individually. The mobile station apparatus 1 uses the values of the offset of the first ACK/NACKs and the offset of the second ACK/NACKs set by the base station apparatus 3, and individually calculates the number of modulation symbols used for the transmission of the first ACK/NACKs and the second ACK/NACKs.

Thus, when the method of coding the first ACK/NACKs differs from the method of coding the second ACK/NACKs, the amount of radio source of the PUSCH used for the transmission of the first ACK/NACKs and the second ACK/NACKs is adjusted, and thus it is possible to make an adjustment such that the first ACK/NACKs is equal in performance to the second ACK/NACKs.

It should be noted that the offset for the first ACK/NACKs and the offset for the second ACK/NACKs may be made in common, and the base station apparatus 3 may set a common offset such that both the first ACK/NACKs and the second ACK/NACKs satisfy a target performance and provide a notification to the mobile station apparatus 1.

Thus, although it is impossible to individually adjust the amount of radio resource of the PUSCH used for the transmission of the first ACK/NACKs and the second ACK/NACKs, the amount of information on the offset of the ACK/NACKs of which the base station apparatus 3 notifies the mobile station apparatus 1 is reduced, and thus it is possible to save the downlink radio resource.

Since, as shown in FIG. 5, the modulation symbols of the ACK/NACKs are arranged in four SC-FDMA symbols alone, the maximum number of modulation symbols of the ACK/NACKs is four times as many as the number of subcarriers included in the frequency band allocated to the PUSCH. In FIG. 5, when Q''' exceeds the maximum number of modulation symbols of the ACK/NACK that can be arranged, subtraction from the number of resource elements where the modulation symbols of the ACK/NACK for the PDSCH in the DL SCC are arranged is performed.

In other words, as long as Q' does not exceed the maximum number of modulation symbols of the ACK/NACK that can be arranged, the number of modulation symbols of the first ACK/NACK is not reduced. Thus, since the performance of the ACK/NACK for the PDSCH in the DL PCC can be maintained, it is possible to maintain the quality of the downlink communication of the primary cell. Formula (2) is a formula for preventing Q''' from exceeding the maximum number of modulation symbols of the ACK/NACK that can be arranged. The function of "min (·)" is a function that outputs the lowest of a plurality of values within parentheses. The symbol of "Nmax" is the maximum number of modulation symbols of the ACK/NACK that can be arranged.

[Formula 2]

$$Q''' = \min(Q'+Q'', N_{max}) \qquad (2)$$

Note that, when Q''' exceeds the maximum number of modulation symbols of the ACK/NACKs that can be arranged, reduction from the number of modulation symbols of the ACK/NACKs for the DL PCC that are arranged may be performed. When four DL SCCs are set, since the ACK/NACKs for the PDSCH of the DL SCC is 8 bits, the ACK/NACKs for the PDSCH of the DL SCC is preferentially arranged as compared with the ACK/NACKs of the DL PCC that is only 2 bits, and thus it is possible to perform transmission without degrading the performance of the ACK/NACK for a larger number of PDSCHs.

Formulas (3) and (4) are formulas for calculating Q' and Q'' that are used for decreasing the number of modulation symbols of the ACK/NACKs for the DL PCC when Q''' exceeds the maximum number of modulation symbols of the ACK/NACKs that can be arranged.

[Formula 3]

$$Q' = \min\left(\text{ceil}\left(\frac{O' \cdot M_{sc}^{PUSCH\text{-}initial} \cdot N_{symb}^{PUSCH\text{-}inital} \cdot \alpha_{offset}^{PUSCH}}{\sum_{r=0}^{C-1} K_r}\right), N_{max} - Q''\right) \qquad (3)$$

-continued

[Formula 4]

$$Q'' = \min\left(\operatorname{ceil}\left(\frac{O'' \cdot M_{sc}^{PUSCH\text{-}inital} \cdot N_{symb}^{PUSCH\text{-}inital} \cdot \beta_{offset}^{PUSCH}}{\sum_{r=0}^{C-1} K_r}\right), N_{max}\right) \quad (4)$$

A method of coding the ACK/NACK in the present invention will be described below.

Figure 6:
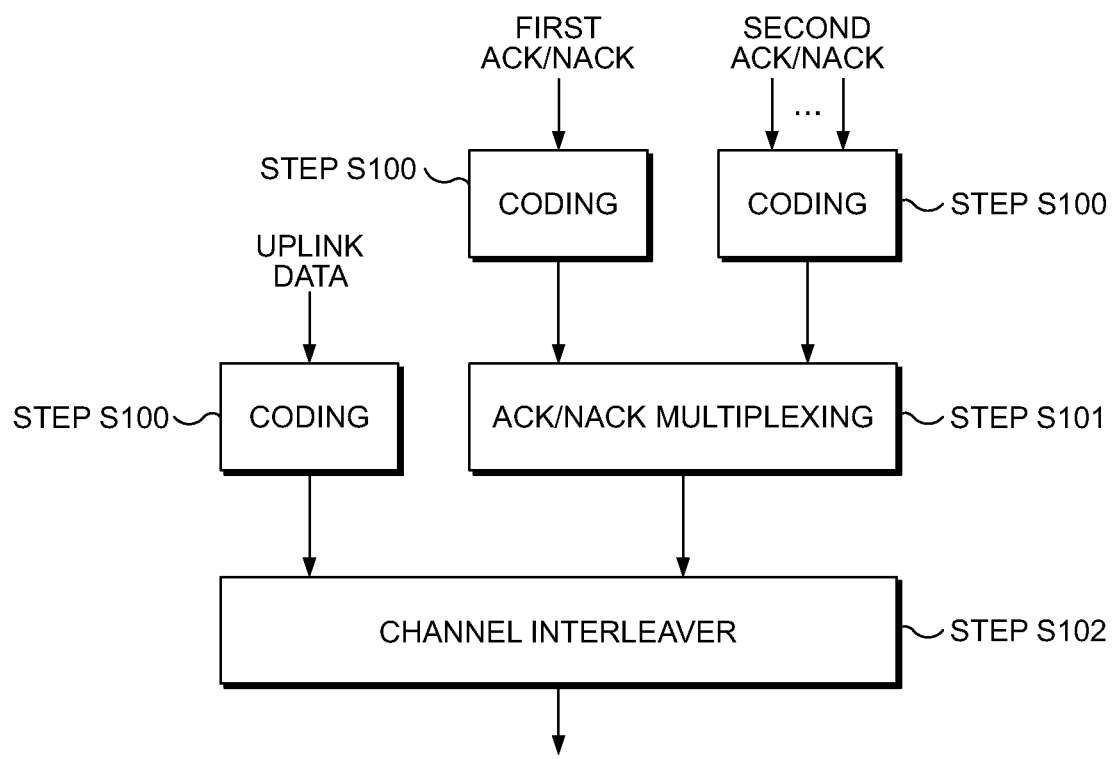
FIG. 6 is a diagram illustrating a method of coding the uplink data and the ACK/NACKs in the present invention.

FIG. 6 is a diagram illustrating the method of coding the uplink data and the ACK/NACKs in the present invention. In FIG. 6, the uplink data, the first ACK/NACKs and the second ACK/NACKs are individually coded (step S100). The second ACK/NACKs for a plurality of DL SCCs are coded together.

The uplink data is subjected to turbo coding. The ACK/NACKs for the PDSCH of a plurality of DL SCCs are coded with the Reed-Muller code. The ACK/NACKs for the PDSCH of the DL PCC are coded by communication channel coding using a repetition code or the like, and the coded bits of a predetermined value are inserted every two generated and coded bits. The number of coded bits of the predetermined value that are inserted is determined on the basis of the modulation scheme of the PUSCH.

When the PUSCH is modulated by 16QAM (Quadrature Amplitude Modulation), two coded bits of a predetermined value are inserted every two generated and coded bits. When the PUSCH is modulated by 64 QAM, four coded bits of a predetermined value are inserted every two generated and coded bits.

Thus, the modulation symbol of the ACK/NACKs for the PDSCH of the DL PCC include only the amount of information of 2 bits regardless of the modulation scheme of the PUSCH, the number of constellation points of the modulation symbols of the ACK/NACKs is limited to four. In the four constellation points described above, the coded bits and the constellation points are made to correspond to each other such that the amplitude of 16QAM or 64QAM is maximized at the four signal points.

For example, when the PUSCH is modulated by 16QAM, if the sequence of the coded bits of the ACK/NACKs for the PDSCH of the DL PCC is "110110", the coded bit of a predetermined value (x) for this sequence is inserted such that the sequence becomes "11xx01xx10" (x is the predetermined value of 0 or 1). Moreover, "00xx", "01xx", "10xx" and "11xx" are made to correspond to the four signal points at which the amplitude of 16QAM or 64QAM is maximized. Thus, even when the mobile station apparatus 1 modulates the coded bits of the ACK/NACKs by 16QAM or 64QAM, the base station apparatus 3 can treat the modulation symbols of the ACK/NACKs as the QPSK. Hereinafter, this method is referred to as a virtual QPSK.

After, in step S100, the first ACK/NACKs and the second ACK/NACKs are coded, the coded bit sequence of the second ACK/NACKs is concatenated (multiplexed) to the back of the coded bit sequence of the first ACK/NACKs (step S101).

Figure 7:
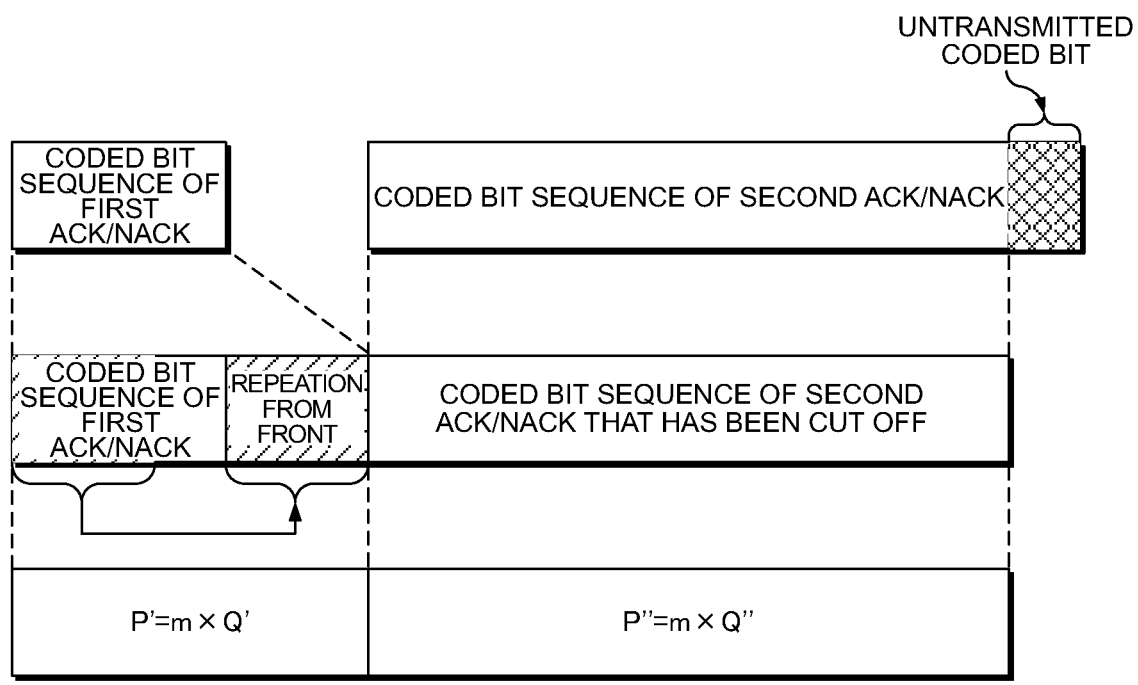
FIG. 7 is a diagram showing an example of a method of concatenating first ACK/NACKs and second ACK/NACKs in the present invention.

FIG. 7 is a diagram showing an example of a method of concatenating the first ACK/NACKs and the second ACK/NACKs in the present invention. The coded bit sequence length P''' of the ACK/NACKs transmitted in the PUSCH is the product of Q''' and the modulation order m of the PUSCH. The coded bit sequence length P' of the first ACK/NACKs transmitted in the PUSCH is the product of Q' and the modulation order m of the PUSCH. The coded bit sequence length P'' of the second ACK/NACKs transmitted in the PUSCH is the product of Q' and the modulation order m of the PUSCH.

In FIG. 7, the coded bit sequence length of the first ACK/NACKs coded in step S100 is shorter than that of P'. In this case, until the coded bit length becomes equal to the number of bits of P', the repeated arrangement is performed from the front part of the coded bits of the first ACK/NACKs.

In FIG. 7, the coded bit sequence length of the second ACK/NACKs coded in step S100 is longer than that of P'''. In this case, in the coded bits of the second ACK/NACKs, part thereof up to the number of P''' is cut off from the front part. In other words, the end part of the coded bits of the second ACK/NACK that exceeds P''' is not transmitted in the PUSCH.

The coded bits of the first ACK/NACKS and the coded bits of the second ACK/NACKS that are repeated from the head or removed from the head as described above are concatenated.

After step S100 and step S101, the coded bits of the uplink data and the coded bits of the ACK/NACK S are rearranged as in FIG. 5 (step S102). First, the coded bits of the uplink data are aligned in the domains other than DMRS of FIG. 5. Then, the coded bits of the uplink data arranged in the domain of the ACK/NACK of FIG. 5 are replaced by the coded bits of the first ACK/NACKS and/or the coded bits of the second AcK/NAcKs.

When the PDSCH is received in the DL PCC alone, coding processing on the first ACK/NACKs is performed, and coding processing on the second ACK/NACKs is not performed.

The configuration of the mobile station apparatus 1 according to the present invention will be described below.

Figure 8:
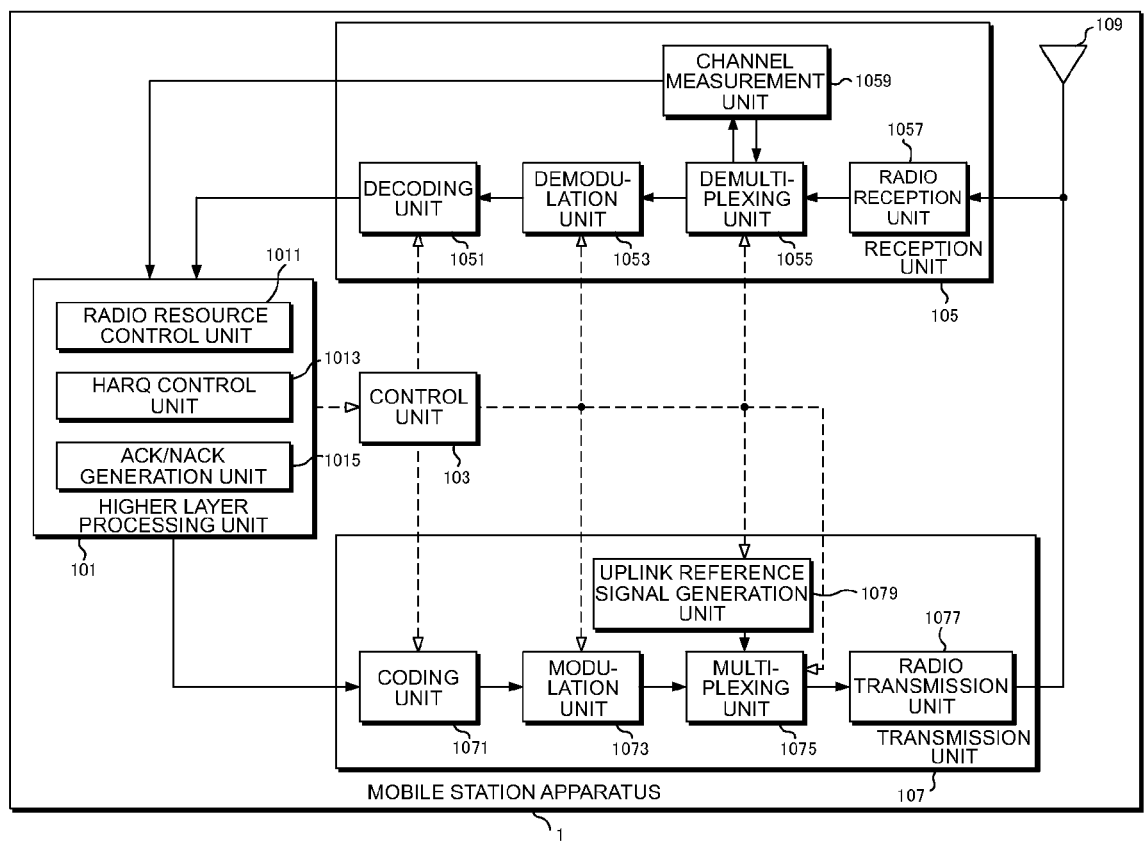
FIG. 8 is a schematic block diagram showing the configuration of a mobile station apparatus 1 in the present invention.

FIG. 8 is a schematic block diagram showing the configuration of the mobile station apparatus 1 according to the present invention. As shown in the figure, the mobile station apparatus 1 is configured to include a higher layer processing unit 101, a control unit 103, a reception unit 105, a transmission unit 107 and a transmission/reception antenna 109. The higher layer processing unit 101 is configured to include a radio resource control unit 1011, a HARQ control unit 1013 and an ACK/NACK generation unit 1015. The reception unit 105 is configured to include a decoding unit 1051, a demodulation unit 1053, a demultiplexing unit 1055, a radio reception unit 1057 and a channel measurement unit 1059. The transmission unit 107 is configured to include a coding unit 1071, a modulation unit 1073, a multiplexing unit 1075, a radio transmission unit 1077 and an uplink reference signal generation unit 1079.

The higher layer processing unit 101 outputs, to the transmission unit 107, uplink data generated such as by the operation of a user. Moreover, the higher layer processing unit 101 also performs processing on a Medium Access Control (MAC) layer, a Packet Data Convergence Protocol (PDCP) layer, a Radio Link Control (RLC) layer and a Radio Resource Control (RRC) layer. Furthermore, based on downlink control information or the like received in the PDCCH, the higher layer processing unit 101 generates control information for controlling the reception unit 105 and the transmission unit 107 and outputs it to the control unit 103.

The radio resource control unit 1011 included in the higher layer processing unit 101 manages various types of setting information on its device. For example, the radio resource control unit 1011 manages CCs that are set. Moreover, the radio resource control unit 1011 generates information arranged in each channel of the uplink and outputs it to the transmission unit 107.

The HARQ control unit 1013 included in the higher layer processing unit 101 controls the HARQ of the downlink data. When the HARQ control unit 1013 successfully decodes the received downlink data, the HARQ control unit 1013 instructs the ACK/NACK generation unit 1015 to generate the ACK and transmit it to the base station apparatus 3 whereas, when the HARQ control unit 1013 fails to decode the received downlink data, the HARQ control unit 1013 instructs the ACK/NACK generation unit 1015 to generate the NACK and transmit it to the base station apparatus 3.

When the HARQ control unit 1013 fails to decode the downlink data, the HARQ control unit 1013 keeps the downlink data in the HARQ buffer, and, when downlink data retransmitted by the base station apparatus 3 is received, the downlink data retransmitted and the downlink data kept in the HARQ buffer are combined, and the decoding processing is performed.

The ACK/NACK generation unit 1015 included in the higher layer processing unit 101 generates the ACK or the NACK according to the instruction of the HARQ control unit 1013, and aligns the bits of the ACK/NACK. When the ACK/NACK generation unit 1015 receives the downlink data in the DL PCC alone, the ACK/NACK generation unit 1015 generates the first ACK/NACKs whereas, when the ACK/NACK generation unit 1015 receives the downlink data in at least one DL SCC, the ACK/NACK generation unit 1015 generates the first ACK/NACKs and the second ACK/NACKs.

Note that, when the ACK/NACK generation unit 1015 receives the downlink data in at least one DL SCC but does not receive the downlink data in part of the DL CC (DL PCC or DL SCC), the ACK/NACK generation unit 1015 generates the ACK/NACK as the NACK.

The ACK/NACK generation unit 1015 calculates the number of modulation symbols of the ACK/NACKs when the ACK/NACKs are transmitted in the PUSCH, generates the ACK/NACK modulation symbols corresponding to the number of modulation symbols calculated, generates control information for controlling the transmission unit 107 such that both the ACK/NACKs and the uplink data are transmitted in the PUSCH and outputs it to the control unit 103.

Based on the control information from the higher layer processing unit 101, the control unit 103 generates a control signal for controlling the reception unit 105 and the transmission unit 107. The control unit 103 outputs the generated control signal to the reception unit 105 and the transmission unit 107, and controls the reception unit 105 and the transmission unit 107.

The reception unit 105 demultiplexes, demodulates and decodes, according to the control signal input from the control unit 103, the reception signal received from the base station apparatus 3 through the transmission/reception antenna 109, and transmits the decoded information to the higher layer processing unit 101.

The radio reception unit 1057 converts (downconverts) the downlink signal received through the transmission/reception antenna 109 into an intermediate frequency, removes an unnecessary frequency component, controls the amplitude level so as to properly maintain the signal level, quadrature demodulates it based on the inphase component and the quadrature component of the received signal and converts the quadrature demodulated analog signal into a digital signal. The radio reception unit 1057 removes, from the converted digital signal, a part corresponding to a Guard Interval (GI), performs Fast Fourier Transform (FFT) on the signal in which the guard interval is removed and extracts the signal of the frequency domain.

The demultiplexing unit 1055 demultiplexes the extracted signal into the PHICH, the PDCCH, the PDSCH and the downlink reference signal. This demultiplexing is performed based on the radio resource allocation information and the like notified by the downlink assignment. Moreover, the demultiplexing unit 1055 compensates for the channel of the PHICH, the PDCCH and the PDSCH from the estimation value of the channel input from the channel measurement unit 1059. Furthermore, the demultiplexing unit 1055 outputs the demultiplexed downlink reference signal to the channel measurement unit 1059.

The demodulation unit 1053 multiplies and combines a code corresponding to the PHICH, and performs the demodulation of a BPSK (Binary Phase Shift Keying) modulation scheme on the combined signal and outputs it to the decoding unit 1051. The decoding unit 1051 decodes the PHICH for its device, and outputs the decoded HARQ indicator to the higher layer processing unit 101. The demodulation unit 1053 performs the demodulation of the QPSK modulation scheme on the PDCCH, and outputs it to the decoding unit 1051. When the decoding unit 1051 attempts to perform blind coding on the PDCCH, and successfully achieves the blind coding, the decoding unit 1051 outputs the decoded downlink control information and RNTI included in the downlink control information to the higher layer processing unit 101.

The demodulation unit 1053 performs, on the PDSCH, the demodulation of a modulation scheme notified by the downlink assignment, such as QPSK (Quadrature Phase Shift Keying), 16QAM (Quadrature Amplitude Modulation) or 64QAM, and outputs it to the decoding unit 1051. The decoding unit 1051 performs decoding based on information on the coding rate notified through the downlink control information, and outputs the decoded downlink data (transport block) to the higher layer processing unit 101.

The channel measurement unit 1059 measures, from the downlink reference signal input from the demultiplexing unit 1055, the path loss of the downlink and the state of the channel, and outputs the pass loss and the state of the channel measured to the higher layer processing unit 101. Moreover, the channel measurement unit 1059 calculates the estimation value of the downlink channel from the downlink reference signal, and outputs it to the demultiplexing unit 1055.

The transmission unit 107 generates the uplink reference signal according to the control signal input from the control unit 103, codes and modulates the uplink data and the uplink control information input from the higher layer processing unit 101, multiplexes the PUCCH, the PUSCH and the uplink reference signal generated above and transmits it to the base station apparatus 3 through the transmission/reception antenna 109.

The coding unit 1071 performs coding such as convolution coding or block coding, on the uplink control information input from the higher layer processing unit 101, and performs, on the uplink data, turbo coding based on the information on the coding rate notified by the uplink grant.

When the coding unit 1071 transmits the ACK/NACKs in the PUSCH along with the uplink data, the coding unit 1071 codes, as shown in FIG. 6, the ACK/NACKs and the uplink data according to the control signal input from the control unit 103, and rearranges the coded bits of ACK/NACKs and the uplink data as in FIG. 5.

The modulation unit 1073 modulates the coded bits input from the coding unit 1071 by the modulation scheme notified through the downlink control information such as BPSK, QPSK, 16QAM or 64QAM or a modulation scheme predetermined for each channel. Based on the number of sequences notified by the uplink grant and spatially multiplexed and information indicating precoding that is performed for these sequences, the modulation unit 1073 uses the MIMO SM, and thereby maps the sequences of the modulation symbols of a plurality of pieces of uplink data transmitted in the same PUSCH on a plurality of sequences greater than the number of pieces of uplink data transmitted in the same PUSCH and performs the precoding on the sequences.

The uplink reference signal generation unit 1079 generates a sequence which is determined by a predetermined rule based on a physical cell identity (referred to as a PCI, a Cell ID or the like) for identifying the base station apparatus 3, a bandwidth where the uplink reference signal is arranged, a cyclic shift notified by the uplink grant and the like and in which the base station apparatus 3 is known. The multiplexing unit 1075 rearranges, in parallel, the modulation symbols of the PUSCH according to the control signal input from the control unit 103, then performs Discrete Fourier Transform (DFT) and multiplexes the signals of the PUCCH and the PUSCH and the uplink reference signal for each transmission antenna port.

The radio transmission unit 1077 performs Inverse Fast Fourier Transform (IFFT) on the multiplexed signals, and performs the modulation of the SC-FDMA scheme, adds the guard interval to the SC-FDMA symbol subjected to the SC-FDMA modulation, generates the digital signal of a baseband, converts the digital signal of the baseband into an analog signal, generates the inphase component and the quadrature component of the intermediate frequency from the analog signal, removes an extra frequency component for the intermediate frequency band, converts (upconverts) the signal of the intermediate frequency into a high frequency signal, removes an extra frequency component, power-amplifies it and outputs it to the transmission/reception antenna 109.

The configuration of the base station apparatus 3 according to the present invention will be described below.

Figure 9:
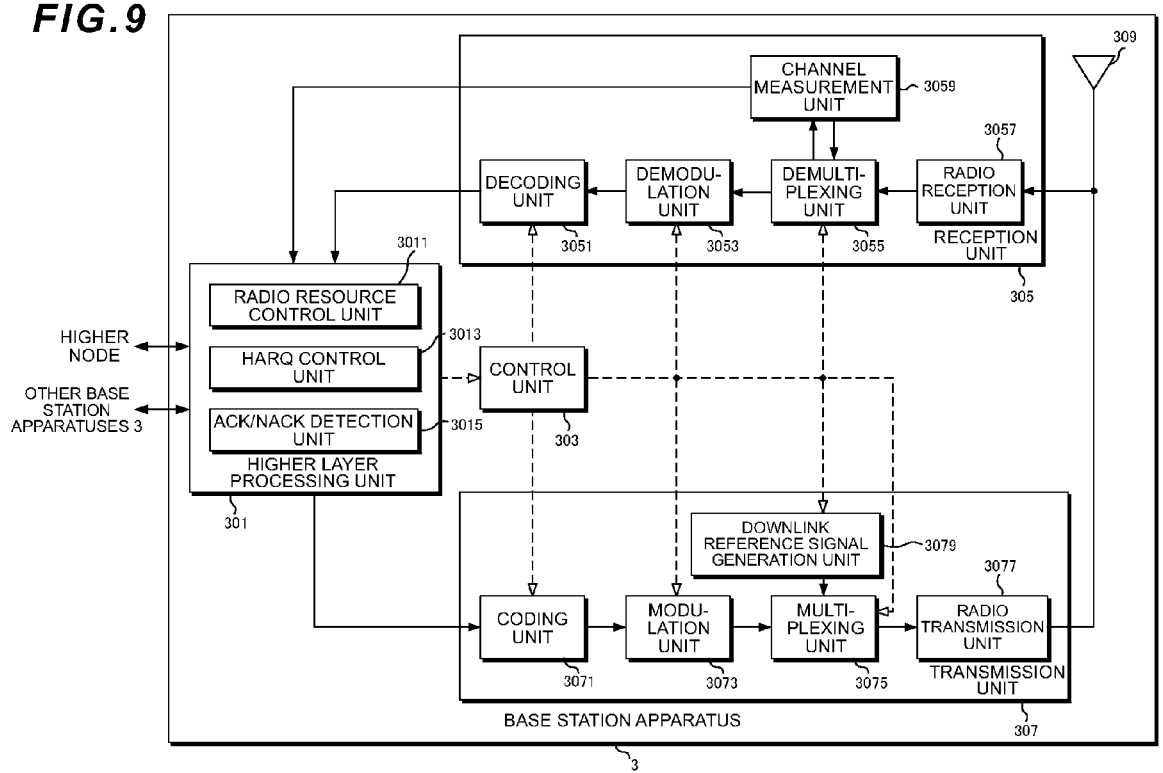
FIG. 9 is a schematic block diagram showing the configuration of a mobile station apparatus 3 according to the present invention.

FIG. 9 is a schematic block diagram showing the configuration of the base station apparatus 3 according to the present invention. As shown in the figure, the base station apparatus 3 is configured to include a higher layer processing unit 301, a control unit 303, a reception unit 305, a transmission unit 307 and a transmission/reception antenna 309. Moreover, the higher layer processing unit 301 is configured to include a radio resource control unit 3011, a HARQ control unit 3013 and an ACK/NACK detection unit 3015. Furthermore, the reception unit 305 is configured to include a decoding unit 3051, a demodulation unit 3053, a demultiplexing unit 3055, a radio reception unit 3057 and a channel measurement unit 3059. Moreover, the transmission unit 307 is configured to include a coding unit 3071, a modulation unit 3073, a multiplexing unit 3075, a radio transmission unit 3077 and a downlink reference signal generation unit 3079.

The higher layer processing unit 301 performs processing on the Medium Access Control (MAC) layer, the Packet Data Convergence Protocol (PDCP) layer, the Radio Link Control (RLC) layer and the Radio Resource Control (RRC) layer. Moreover, the higher layer processing unit 301 generates control information for controlling the reception unit 305 and the transmission unit 307 and outputs it to the control unit 303.

The radio resource control unit 3011 included in the higher layer processing unit 301 generates the downlink data arranged in the downlink PDSCH, the RRC signal and the MAC CE (Control Element) or acquires them from the higher node, and outputs them to the HARQ control unit 3013. Furthermore, the radio resource control unit 3011 also manages various types of setting information of each mobile station apparatus 1. For example, the radio resource control unit 3011 performs, for example, the management of CCs set in the mobile station apparatus 1.

The HARQ control unit 3013 included in the higher layer processing unit 301 controls the HARQ of the downlink data. The HARQ control unit 3013 keeps, in the HARQ buffer, the downlink data acquired from the radio resource control unit 3011, and, when the HARQ control unit 3013 receives, from the mobile station apparatus 1, the NACK for the downlink data kept in the HARQ buffer, the HARQ control unit 3013 outputs the kept downlink data to the transmission unit 307, generates the control information to perform control so as to perform retransmission and outputs it to the control unit 303.

The ACK/NACK detection unit 3015 included in the higher layer processing unit 301 generates control information to control the decoding processing on the ACK/NACKs of the reception unit 305, and outputs it to the control unit 303. The ACK/NACK detection unit 3015 calculates, from the number of downlink component carriers set in the mobile station apparatus 1 and the like, the number of bits of the bit sequence of the ACK/NACKs transmitted by the mobile station apparatus 1 and the number of modulation symbols of the ACK/NACKs arranged in the PUSCH.

When the ACK/NACK detection unit 3015 transmits the downlink data to the mobile station apparatus 1 in the DL PCC alone, the ACK/NACK detection unit 3015 determines that the PUSCH includes only the first ACK/NACKs and does not include the second ACK/NACKs. The ACK/NACK detection unit 3015 determines that the ACK/NACK for the DL CC in which the downlink data is not transmitted to the mobile station apparatus 1 is set at the NACK.

The ACK/NACK detection unit 3015 demultiplexes, based on the calculated number of modulation symbols of the ACK/NACK, the modulation symbols of the ACK/NACKs included in the PUSCH, and controls the reception unit 305 through the control unit 303 such that the first ACK/NACKs and the second ACK/NACKs are individually decoded.

Based on the control information from the higher layer processing unit 301, the control unit 303 generates a control signal for controlling the reception unit 305 and the transmission unit 307. The control unit 303 outputs the generated control signal to the reception unit 305 and the transmission unit 307, and controls the reception unit 305 and the transmission unit 307.

The reception unit 305 demodulates, demultiplexes and decodes, according to the control signal input from the control unit 303, the reception signal received from the mobile station apparatus 1 through the transmission/reception antenna 309, and outputs the decoded information to the higher layer processing unit 301. The radio reception unit 3057 converts (downconverts) the uplink signal received through the transmission/reception antenna 309 into an intermediate frequency, removes an unnecessary frequency component, controls the amplitude level so as to properly maintain the signal level, quadrature demodulates it based on the inphase component and the quadrature component of the received signal and converts the quadrature demodulated analog signal into a digital signal.

The radio reception unit 3057 removes, from the converted digital signal, a part corresponding to a Guard Interval (GI), performs Fast Fourier Transform (FFT) on the signal in which the guard interval is removed, extracts the signal of the frequency domain and outputs it to the demultiplexing unit 3055.

The demultiplexing unit 3055 demultiplexes the signal input from the radio reception unit 3057 into the PUCCH, the PUSCH, the uplink reference signal and the like. This demultiplexing is performed based on the radio resource allocation information included in the uplink grant that is previously determined by the base station apparatus 3 through the radio resource control unit 3011 and that is notified to each mobile station apparatus 1. The demultiplexing unit 3055 compensates for the channel of the PUCCH and the PUSCH from the estimation value of the channel input from the channel measurement unit 3059. The demultiplexing unit 3055 outputs the demultiplexed uplink reference signal to the channel measurement unit 3059.

The demodulation unit 3053 performs Inverse Discrete Fourier Transform (IDFT) on the PUSCH, acquires the modulation symbols and demodulates, on the modulation symbols of the PUCCH and the PUSCH, the reception signal using the modulation scheme which is previously determined, such as BPSK (Binary Phase Shift Keying), QPSK, 16QAM or 64QAM, or of which its device previously notifies each mobile station apparatus 1 with the uplink grant. The demodulation unit 3053 demultiplexes, according to the control signal input from the control unit 303, the modulation symbols of the uplink data included in the PUSCH, the modulation symbols of the first ACK/NACKs and the modulation symbols of the second ACK/NACKs.

Based on the number of sequences that are previously notified to each mobile station apparatus 1 by the uplink grant and that are spatially multiplexed and information that indicates precoding performed on the sequences, the demodulation unit 3053 uses the MIMO SM to demultiplex the modulation symbols of a plurality of pieces of uplink data transmitted in the same PUSCH.

The decoding unit 3051 decodes the demodulated uplink control information and the coded bits of the uplink data at the coding rate of a predetermined coding scheme which is previously determined or of which its device previously notifies the mobile station apparatus 1 with the uplink grant, and outputs the decoded uplink data and the uplink control information to the higher layer processing unit 301. When the PUSCH is retransmitted, the decoding unit 3051 performs decoding using the coded bits input from the higher layer processing unit 301 and kept in the HARQ buffer and the demodulated coded bits.

The decoding unit 3051 individually decodes the coded bits of the first ACK/NACKs and the second ACK/NACKs. The channel measurement unit 3059 measures the estimation value of the channel, the quality of the channel and the like from the uplink reference signal input from the demultiplexing unit 3055, and outputs them to the demultiplexing unit 3055 and the higher layer processing unit 301.

The transmission unit 307 generates the downlink reference signal according to the control signal input from the control unit 303, codes and modulates the HARQ indicator, the downlink control information and the downlink data input from the higher layer processing unit 301, multiplexes the PHICH, the PDCCH, the PDSCH and the downlink reference signal and transmits the signals to the mobile station apparatus 1 through the transmission/reception antenna 309.

The coding unit 3071 codes the HARQ indicator, the downlink control information and the downlink data input from the higher layer processing unit 301 using a predetermined coding scheme such as block coding, convolution coding or turbo coding, or using a coding scheme determined by the radio resource control unit 3011. The modulation unit 3073 modulates the coded bits input from the coding unit 3071 using a predetermined modulation scheme such as BPSK, QPSK, 16QAM or 64QAM or a modulation scheme determined by the radio resource control unit 3011.

Based on a physical cell identifier (PCI) for identifying the base station apparatus 3 and the like, the downlink reference signal generation unit 3079 generates, as the downlink reference signal, the sequence which is determined by a predetermined rule and whose mobile station apparatus 1 is known. The multiplexing unit 3075 multiplexes the modulated modulation symbols of each channel and the generated downlink reference signal.

The radio transmission unit 3077 performs Inverse Fast Fourier Transform (IFFT) on the multiplexed modulation symbols or the like, and performs the modulation of the OFDM scheme, adds the guard interval to the OFDM symbol subjected to the OFDM modulation, generates the digital signal of a baseband, converts the digital signal of the baseband into an analog signal, generates the inphase component and the quadrature component of the intermediate frequency from the analog signal, removes an extra frequency component for the intermediate frequency band, converts (upconverts) the signal of the intermediate frequency into a high frequency signal, removes an extra frequency component, power-amplifies it and outputs it to the transmission/reception antenna 309.

As described above, in the present invention, in the wireless communication system where the mobile station apparatus 1 and the base station apparatus 3 use a plurality of CCs to perform radio communication, the mobile station apparatus 1 codes one or a plurality of pieces of first ACK/NACK (first response information) indicating whether or not one or a plurality of pieces of downlink data received by the DL PCC (first downlink component carrier) are successfully decoded, codes a plurality of pieces of second ACK/NACK (second response information) indicating whether or not a plurality of pieces of downlink data received by the DL SCC (second downlink component carrier) are successfully decoded and transmits the first ACK/NACK and the second ACK/NACK in the same PUSCH (uplink data transmission channel), and the base station apparatus 3 receives the PUSCH and individually performs decoding processing on the first ACK/NACK and the second ACK/NACK.

Furthermore, in the present invention, when the mobile station apparatus 1 receives the PDSCH in the DL PCC alone, the mobile station apparatus 1 generates only the first ACK/NACK and transmits it in the PUSCH.

In this way, when the amount of downlink data is low, the base station apparatus 3 and the mobile station apparatus 1 use only the PDSCH of the DL PCC to perform downlink communication, and thus the mobile station apparatus 1 is prevented from transmitting, in the PUSCH, the second ACK/NACK for the PDSCH of the DL SCC, with the result that it is possible to efficiently use the radio resources of the PUSCH for transmitting the uplink data.

Moreover, when the amount of downlink data is high, the base station apparatus 3 and the mobile station apparatus 1 simultaneously use a plurality of PDSCHs of the DL PCC and a plurality of DL SCCs to perform communication. Here, a plurality of pieces of second ACK/NACK for a plurality of DL SCCs is coded together, and thus the performance of the second ACK/NACK is enhanced as compared with a case where the plurality of pieces of second ACK/NACK is individually coded.

Furthermore, although the base station apparatus 3 uses the DL PCC and one or a plurality of DL SCCs to transmit a plurality of PDSCHs to the mobile station apparatus 1, when the mobile station apparatus 1 receives the PDSCH in the DL PCC alone, the mobile station apparatus 1 codes the first ACK/NACK and applies the mapping using the method as the PDSCH of the DL SCC is received, with the result that the base station apparatus 3 can properly receive the first ACK/NACK.

Moreover, the present embodiment can adopt the following aspect. Specifically, in the wireless communication system of the present embodiment that is a wireless communication system where a mobile station apparatus and a base station apparatus perform radio communication, the mobile station apparatus codes one or a plurality of pieces of first response information indicating whether or not one or a plurality of pieces of downlink data received by the first downlink component carrier are successfully decoded, codes a plurality of pieces of second response information indicating whether or not pieces of downlink data received by a plurality of second downlink component carrier are successfully decoded and transmits the first response information and the second response information in the same uplink data transmission channel, and the base station apparatus receives the uplink data transmission channel and individually performs decoding processing on the first response information and the second response information.

Furthermore, in the present embodiment, in the wireless communication system described above, the base station apparatus sets, for each mobile station apparatus, one first downlink component carrier described above and a plurality of second downlink component carriers described above.

Moreover, in the present embodiment, in the wireless communication system described above, the mobile station apparatus individually calculates the number of coded bits of the first response information that can be transmitted in the uplink data transmission channel and the number of coded bits of the second response information that can be transmitted in the uplink data transmission channel.

Furthermore, in the present embodiment, in the wireless communication system described above, when the sum of the coded bits of the first response information and the second response information exceeds the number of bits of the response information that can be transmitted in the uplink data transmission channel, the mobile station apparatus preferentially transmits the coded bits of the first response information in the uplink data transmission channel.

Moreover, in the present embodiment, in the wireless communication system described above, when the sum of the coded bits of the first response information and the second response information exceeds the number of bits of the response information that can be transmitted in the uplink data transmission channel, the mobile station apparatus preferentially transmits the coded bits of the second response information in the uplink data transmission channel.

Furthermore, in the present embodiment, in the wireless communication system described above, the mobile station apparatus individually sets: a value of a first offset used by the mobile station apparatus when the mobile station apparatus calculates the number of coded bits of the first response information that can be transmitted in the uplink data transmission channel, and a value of a second offset value used by the mobile station apparatus when the mobile station apparatus calculates the number of coded bits of the second response information that can be transmitted in the uplink data transmission channel.

Moreover, in the present embodiment, in the wireless communication system described above, the mobile station apparatus transmits the first response information and the second response information in the same SC-FDMA symbol.

Furthermore, in the present embodiment, in the wireless communication system described above, when the mobile station apparatus receives the downlink data in the first downlink component carrier alone, the mobile station apparatus transmits only the first response information in the uplink data transmission channel.

Moreover, in the present embodiment, in the wireless communication system described above, when the mobile station apparatus receives the downlink data in at least one second downlink component carrier described above, the mobile station apparatus transmits the first response information and the second response information in the uplink data transmission channel.

Furthermore, in the present embodiment, in the wireless communication system described above, when the mobile station apparatus receives the downlink data in at least one second downlink component carrier described above but does not receive the downlink data in the first downlink component carrier, the mobile station apparatus sets the second response information at a predetermined value.

Moreover, the mobile station apparatus of the present embodiment is a mobile station apparatus that performs radio communication with a base station apparatus using a plurality of component carriers, and the mobile station apparatus codes one or a plurality of pieces of first response information indicating whether or not one or a plurality of pieces of downlink data received by the first downlink component carrier are successfully decoded, codes a plurality of pieces of second response information indicating whether or not downlink data received by a plurality of second downlink component carriers is successfully decoded, and transmits the first response information and the second response information in the same uplink data transmission channel.

In the base station apparatus of the present embodiment that is a base station apparatus using a plurality of component carriers to perform radio communication with a mobile station apparatus, receives an uplink data transmission channel transmitted and including first response information and second response information and individually performs decoding processing on the first response information and the second response information, wherein one or a plurality of pieces of the first response information indicating whether or not one or a plurality of pieces of downlink data received by a first downlink component carrier are successfully decoded is coded by the mobile station apparatus and a plurality of pieces of the second response information indicating whether or not downlink data received by a plurality of second downlink component carriers are successfully decoded is coded by the mobile station apparatus.

Furthermore, the wireless communication method of the present embodiment is a wireless communication method that is used in a mobile station apparatus using a plurality of component carriers to perform radio communication with the base station apparatus, and includes a step of coding one or a plurality of pieces of first response information indicating whether or not one or a plurality of pieces of downlink data received by a first downlink component carrier are successfully decoded, a step of coding a plurality of pieces of second response information indicating whether or not downlink data received by a plurality of second downlink component carriers are successfully decoded and a step of transmitting the first response information and the second response information in the same uplink data transmission channel.

Moreover, the wireless communication method of the present embodiment is a wireless communication method that is used in a base station apparatus using a plurality of component carriers to perform radio communication with the base station apparatus, and includes a step of receiving an uplink data transmission channel transmitted and including first response information and second response information, and a step of individually performing decoding processing on the first response information and the second response information, wherein one or a plurality of pieces of the first response information indicating whether or not one or a plurality of pieces of downlink data received by a first downlink component carrier are successfully decoded is coded by the mobile station apparatus and a plurality of pieces of the second response information indicating whether or not downlink data received by a plurality of second downlink component carriers are successfully decoded is coded by the mobile station apparatus.

Furthermore, an integrated circuit of the present embodiment is an integrated circuit that is used in a mobile station apparatus using a plurality of component carriers to perform radio communication with a base station apparatus, and makes the mobile station apparatus achieve a series of functions below: a function of coding one or a plurality of pieces of first response information indicating whether or not one or a plurality of pieces of downlink data received by a first downlink component carrier are successfully decoded, a function of coding a plurality of pieces of second response information indicating whether or not downlink data received by a plurality of second downlink component carriers are successfully decoded, and a function of transmitting the first response information and the second response information in the same uplink data transmission channel.

Moreover, an integrated circuit of the present embodiment is an integrated circuit that is used in a base station apparatus using a plurality of component carriers to perform radio communication with a mobile station apparatus, and makes the mobile station apparatus achieve a series of functions below: a function of receiving an uplink data transmission channel transmitted and including first response information and second response information, and a function of individually performing decoding processing on the first response information and the second response information, wherein one or a plurality of pieces of the first response information indicating whether or not one or a plurality of pieces of downlink data received by a first downlink component carrier are successfully decoded is coded by the mobile station apparatus and a plurality of pieces of the second response information indicating whether or not downlink data received by a plurality of second downlink component carriers are successfully decoded is coded by the mobile station apparatus.

A program operated by the base station apparatus 3 and the mobile station apparatus 1 according to the present invention may be a program (program that functions a computer) that controls a CPU (Central Processing Unit) and the like so as to realize the functions of the present embodiment according to the present invention. Information dealt with by these devices is temporarily stored in a RAM (Random Access Memory) when it is processed, is thereafter stored in various ROMs such as a flash ROM (Read Only Memory) and a HDD (Hard Disk Drive) and is read and modified and written by the CPU as necessary.

Note that, a part of the mobile station apparatus 1 and the base station apparatus 3 according to the embodiment described above may be realized by a computer. In this case, it may be realized by recording a program for realizing this control function in a computer-readable recording medium and making a computer system read and execute the program recorded in the recording medium.

It should be noted that the "computer system" described herein is a computer system incorporated in the mobile station apparatus 1 or the base station apparatus 3, and includes an OS and hardware such as a peripheral device. The "computer-readable recording medium" refers to a portable medium such as a flexible disc, a magneto-optical disc, a ROM or a CD-ROM or a storage device such as harddisk incorporated in a computer system.

Furthermore, examples of the "computer-readable recording medium" may include a product, such as a communication line, that holds a program shortly and dynamically when the program is transmitted through a network such as the Internet or a communication line such as a telephone line and a product, such as a volatile memory within a computer system serving as a server and a client, that holds a program for a constant period of time. The program described above may be designed to realize part of the function described above or may be designed such that the function described above can be realized by combination with the program already recorded in the computer system.

Part or all of the mobile station apparatus 1 and the base station apparatus 3 according to the embodiment described above may be realized as an LSI, which is typically an integrated circuit or may be realized as a chip set. Each functional block of the mobile station apparatus 1 and the base station apparatus 3 may be individually formed into a chip or part or all thereof may be integrated and formed into a chip. Moreover, a method of formation into an integrated circuit is not limited to an LSI; it may be realized by a dedicated circuit or a general-purpose processor. If the advancement of semiconductor technology realizes an integrated circuit technology that replaces an LSI, it is also possible to use an integrated circuit according to such a technology.

Although the embodiment of the present invention has been described in detail above with reference to the drawings, the specific configuration is not limited to what has been described above. Various design modifications and the like are possible without departing from the spirit of the present invention.

DESCRIPTION OF SYMBOLS

1 (1A, 1B, 1C) mobile station apparatus
3 base station apparatus
101 higher layer processing unit
103 control unit
105 reception unit
107 transmission unit
301 higher layer processing unit
303 control unit
305 reception unit
307 transmission unit
1011 radio resource control unit
1013 HARQ control unit
1015 ACK/NACK generation unit
3011 radio resource control unit
3013 HARQ control unit
3015 ACK/NACK detection unit

The invention claimed is:

1. A mobile station apparatus configured to and/or programmed to transmit ACK/NACK sequences for transport blocks received from a base station apparatus, the mobile station apparatus comprising:
   a receiving circuit configured to and/or programmed to receive modulation and coding scheme information, the modulation and coding scheme information indicating a modulation order for the physical uplink shared channel;
   a coding circuit configured to and/or programmed to:
      code a first ACK/NACK sequence and a second ACK/NACK sequence which is different from the first ACK/NACK sequence, the ACK/NACK sequences comprising the first ACK/NACK sequence and the second ACK/NACK sequence, and
      generate a bit sequence by concatenating coded bits of the first ACK/NACK sequence and coded bits of the second ACK/NACK sequence; and
   a transmitting circuit configured to and/or programmed to transmit the concatenated bit sequence using a physical uplink shared channel in a subframe, wherein each of a first value and a second value is given by multiplying the modulation order for the physical uplink shared channel by a positive integer, a number of the coded bits of the first ACK/NACK sequence being the first value, a number of the coded bits of the second ACK/NACK sequence being the second value.

2. The mobile station apparatus according to claim 1, wherein the coding circuit configured to and/or programmed to:

perform circular repetition of the coded bits of the first ACK/NACK sequence until the number of coded bits of the first ACK/NACK sequence reaches the first value, and perform circular repetition of the coded bits of the second ACK/NACK sequence until the number of coded bits of the second ACK/NACK sequence reaches the second value.

3. The mobile station apparatus according to claim 2, wherein in the circular repetition, in a case that the number of coded bits of the first ACK/NACK sequence is lower than the first value, processing that repeatedly concatenates the coded bits of the first ACK/NACK sequence from the head is performed.

4. The mobile station apparatus according to claim 2, wherein in the circular repetition, in a case that the number of coded bits of the second ACK/NACK sequence is lower than the second value, processing that repeatedly concatenates the coded bits of the second ACK/NACK sequence from the head is performed.

5. The mobile station apparatus according to claim 2, wherein in the circular repetition, in a case that the number of coded bits of the first ACK/NACK sequence is larger than the first value, processing that truncate the coded bits of the first ACK/NACK sequence from the head to the first value is performed.

6. The mobile station apparatus according to claim 2, wherein in the circular repetition, in a case that the number of coded bits of the second ACK/NACK sequences is larger than the second value, processing that truncate the coded bits of the second the circular repetition from the head to the second value is performed.

7. A base station apparatus configured to and/or programmed to receive ACK/NACK sequences for transport blocks transmitted to a mobile station apparatus, the base station apparatus comprising:

a transmitting circuit configured to and/or programmed to transmit modulation and coding scheme information, the modulation and coding scheme information indicating a modulation order for the physical uplink shared channel; and a receiving circuit configured to and/or programmed to receive a bit sequence using a physical uplink shared channel in a subframe, wherein the ACK/NACK sequences comprising a first ACK/NACK sequence and a second ACK/NACK sequence which is different from the first ACK/NACK sequence, the first ACK/NACK sequence and the second ACK/NACK sequence are coded by the mobile station apparatus, the bit sequence is generated by concatenating coded bits of the first ACK/NACK sequence and coded bits of the second ACK/NACK sequence by the mobile station apparatus, and each of a first value and a second value is given by multiplying the modulation order for the physical uplink shared channel by a positive integer, a number of the coded bits of the first ACK/NACK sequence being the first value, a number of the coded bits of the second ACK/NACK sequence being the second value.

8. The base station apparatus according to claim 7, wherein circular repetition of the coded bits of the first ACK/NACK sequence is performed until the number of coded bits of the first ACK/NACK sequence reaches the first value, and circular repetition of the coded bits of the second ACK/NACK sequence is performed until the number of coded bits of the second ACK/NACK sequence reaches the second value.

9. The base station apparatus according to claim 8, wherein in the circular repetition, in case that the number of coded bits of the first ACK/NACK sequence is lower than the first value, processing that repeatedly concatenates the coded bits of the first ACK/NACK sequence from the head is performed.

10. The base station apparatus according to claim 8, wherein in the circular repetition, in case that the number of coded bits of the second ACK/NACK sequence is lower than the second value, processing that repeatedly concatenates the coded bits of the second ACK/NACK sequence from the head is performed.

11. The base station apparatus according to claim 8, wherein in the circular repetition, in case that the number of coded bits of the first ACK/NACK sequence is larger than the first value, processing that truncate the coded bits of the first ACK/NACK sequence from the head to the first value is performed.

12. The base station apparatus according to claim 8, wherein in the circular repetition, in case that the number of coded bits of the second ACK/NACK sequence is larger than the second value, processing that truncate the coded bits of the second ACK/NACK sequence from the head to the second value is performed.

13. A wireless communication system comprising:

a base station apparatus; and a mobile station apparatus configured to and/or programmed to transmit ACK/NACK sequences for transport blocks transmitted by the base station apparatus, wherein said mobile station apparatus is configured to and/or programmed to:

receive modulation and coding scheme information, the modulation and coding scheme information indicating a modulation order for the physical uplink shared channel, code a first ACK/NACK sequence and a second ACK/NACK sequence which is different from the first ACK/NACK sequence, the ACK/NACK sequences comprising the first ACK/NACK sequence and the second ACK/NACK sequence, generate a bit sequence by concatenating coded bits of the first ACK/NACK sequence and coded bits of the second ACK/NACK sequence, and transmit the concatenated bit sequence using a physical uplink shared channel in a subframe, wherein said base station apparatus is configured to and/or programmed to:

transmit modulation and coding scheme information, the modulation and coding scheme information indicating a modulation order for the physical uplink shared channel, receive the concatenated bit sequence using the physical uplink shared channel in the subframe, wherein each of a first value and a second value is given by multiplying the modulation order for the physical uplink shared channel by a positive integer, a number of the coded bits of the first ACK/NACK sequence being the first value, a number of the coded bits of the second ACK/NACK sequence being the second value.

14. A wireless communication method used by a mobile station apparatus that is configured to and/or programmed to transmit ACK/NACK sequences for transport blocks received from a base station apparatus, the wireless communication method comprising:

receiving modulation and coding scheme information, the modulation and coding scheme information indicating a modulation order for the physical uplink shared channel;

coding a first ACK/NACK sequence and a second ACK/NACK sequence which is different from the first ACK/NACK sequence, the ACK/NACK sequences comprising the first ACK/NACK sequence and the second ACK/NACK sequence;

generating a bit sequence by concatenating coded bits of the first ACK/NACK sequence and coded bits of the second ACK/NACK sequence; and transmitting the concatenated bit sequence using a physical uplink shared channel in a subframe, wherein each of a first value and a second value is given by multiplying the modulation order for the physical uplink shared channel by a positive integer, a number of the coded bits of the first ACK/NACK sequence being the first value, a number of the coded bits of the second ACK/NACK sequence being the second value.

15. A wireless communication method used by a base station apparatus that is configured to and/or programmed to receive ACK/NACK sequences for transport blocks transmitted to a mobile station apparatus, the wireless communication method comprising:

transmitting modulation and coding scheme information, the modulation and coding scheme information indicating a modulation order for the physical uplink shared channel; and receiving a bit sequence using a physical uplink shared channel in a subframe, wherein the ACK/NACK sequences comprising a first ACK/NACK sequence and a second ACK/NACK sequence which is different from the first ACK/NACK sequence, the first ACK/NACK sequence and the second ACK/NACK sequence are coded by the mobile station apparatus, the bit sequence is generated by concatenating coded bits of the first ACK/NACK sequence and coded bits of the second ACK/NACK sequence by the mobile station apparatus, and each of a first value and a second value is given by multiplying the modulation order for the physical uplink shared channel by a positive integer, a number of the coded bits of the first ACK/NACK sequence being the first value, a number of the coded bits of the second ACK/NACK sequence being the second value.

* * * * *